(12) United States Patent
Sasaki et al.

(10) Patent No.: US 11,085,765 B2
(45) Date of Patent: Aug. 10, 2021

(54) FREQUENCY ADJUSTMENT METHOD OF VIBRATION ELEMENT, MANUFACTURING METHOD OF VIBRATION ELEMENT, VIBRATION ELEMENT, PHYSICAL QUANTITY SENSOR, INERTIAL MEASUREMENT DEVICE, ELECTRONIC APPARATUS, VEHICLE

(71) Applicant: Seiko Epson Corporation, Tokyo (JP)

(72) Inventors: Shogo Sasaki, Shiojiri (JP); Masashi Shimura, Chino (JP); Keiichi Yamaguchi, Ina (JP); Masahiro Oshio, Shiojiri (JP); Ryuta Nishizawa, Nagano (JP); Seiichiro Ogura, Minowa (JP)

(73) Assignee: Seiko Epson Corporation

( * ) Notice: Subject to any disclaimer, the term of this patent is extended or adjusted under 35 U.S.C. 154(b) by 239 days.

(21) Appl. No.: 16/367,785

(22) Filed: Mar. 28, 2019

(65) Prior Publication Data

US 2019/0301869 A1    Oct. 3, 2019

(30) Foreign Application Priority Data

Mar. 29, 2018    (JP) .............................. JP2018-065214

(51) Int. Cl.
  *G01C 19/5663*    (2012.01)
  *B23K 26/38*      (2014.01)
  *G01C 19/5656*    (2012.01)

(52) U.S. Cl.
  CPC .......... *G01C 19/5663* (2013.01); *B23K 26/38* (2013.01); *G01C 19/5656* (2013.01)

(58) Field of Classification Search
  None
  See application file for complete search history.

(56) References Cited

U.S. PATENT DOCUMENTS

| 9,222,775 B2* | 12/2015 | Nakagawa | H01L 41/0475 |
| 2006/0070442 A1* | 4/2006 | Kawauchi | G01C 19/5628 73/504.12 |
| 2006/0196267 A1* | 9/2006 | Takahashi | G01C 19/5663 73/504.12 |
| 2012/0126664 A1* | 5/2012 | Ogura | H01L 41/0475 310/312 |

FOREIGN PATENT DOCUMENTS

| JP | 2006-105614 A | 4/2006 |
| JP | 2006-311444 A | 11/2006 |
| JP | 2018-165644 A | 10/2018 |

* cited by examiner

*Primary Examiner* — Paul M. West
*Assistant Examiner* — Mark A Shabman
(74) *Attorney, Agent, or Firm* — Harness, Dickey & Pierce, P.L.C.

(57) ABSTRACT

A frequency adjustment method of a vibration element includes adjusting a resonance frequency of the vibration element by irradiating the vibration element, which includes a vibrating arm having a first principal surface and a second principal surface that are in a front and back relationship with each other with an energy ray, to remove a part of the vibrating arm on the first principal surface, and in which an activation amount by the energy ray on the second principal surface of the vibrating arm is smaller than an activation amount by the energy ray on the first principal surface of the vibrating arm.

19 Claims, 12 Drawing Sheets

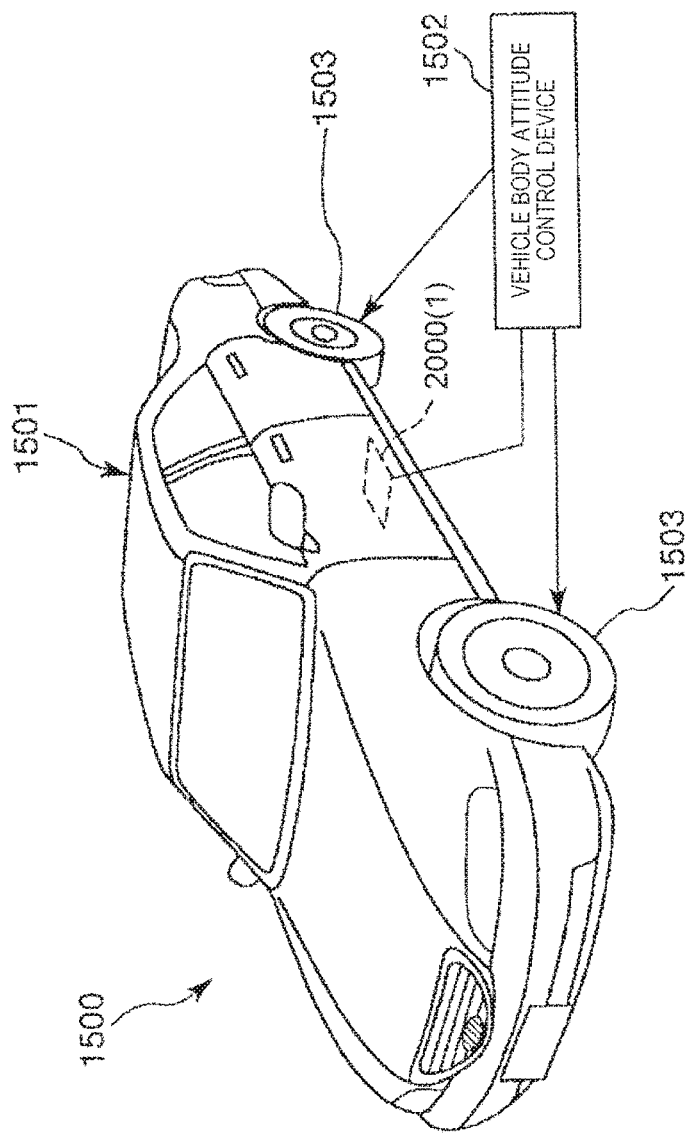

FREQUENCY ADJUSTMENT METHOD OF VIBRATION ELEMENT, MANUFACTURING METHOD OF VIBRATION ELEMENT, VIBRATION ELEMENT, PHYSICAL QUANTITY SENSOR, INERTIAL MEASUREMENT DEVICE, ELECTRONIC APPARATUS, VEHICLE

CROSS-REFERENCE

The entire disclosure of Japanese Patent Application No. 2018-065214, filed Mar. 29, 2018 is expressly incorporated by reference herein.

BACKGROUND

1. Technical Field

The present invention relates to a frequency adjustment method of a vibration element, a manufacturing method of the vibration element, the vibration element, a physical quantity sensor, an inertial measurement device, an electronic apparatus, and a vehicle.

2. Related Art

In the related art, a physical quantity detection device that measures a physical quantity such as an angular velocity and acceleration by using a vibration element such as a piezoelectric vibrator or a micro electro mechanical systems (MEMS) vibrator is known.

As an example of such a physical quantity detection device, for example, in JP-A-2006-105614, a vibratory gyroscope including a piezoelectric vibrator element which includes a base portion, a connecting arm extending from the base portion, a plurality of drive arms extending from a tip end portion of the connecting arm, and a plurality of detection arms extending from the base portion is disclosed. When such a vibratory gyroscope receives an angular velocity in a predetermined direction in a state where the drive arm is subjected to flexural vibration, a Coriolis force acts on the drive arms, and accordingly, the detection arms are subjected to flexural vibration. By detecting such flexural vibration of the detection arms, the angular velocity can be measured.

In the vibratory gyroscope described in JP-A-2006-105614, a weight layer made of metal is provided at the tip end portion of each drive arm. Then, in order to reduce vibration leakage from the drive arms to the base portion caused by unbalance of resonance frequencies of the drive arms, mass adjustment of each drive arm is performed by removing the weight layer at the tip end portion of each drive arm.

In the mass adjustment of the drive arm described in JP-A-2006-105614, the weight layer is irradiated with a laser and a part of the weight layer is removed to adjust the mass of the weight layer. When the weight layer is irradiated with the laser, an irradiated region is activated and foreign matters such as organic substances are likely to adhere. As a result, there is a problem that vibration balance of the adjusted drive arm deviates over time.

In a case where the mass adjustment is performed on the weight layer provided on one principal surface of the drive arm, an unintended change in mass may occur also on a weight layer provided on the other principal surface which is not directly irradiated with the laser. Since such a change in mass is unintended, the vibration balance of the vibrating arm causes a deviation over time. If the vibration balance deviates, vibration leakage easily occurs.

SUMMARY

An advantage of some aspects of the invention is to solve the problem described above, and the invention can be implemented as the following application examples.

A frequency adjustment method of a vibration element according to an application example includes adjusting a resonance frequency of the vibration element by irradiating the vibration element, which includes a base and a vibrating arm having a first principal surface and a second principal surface that are in a front and back relationship with each other and extending from the base, with an energy ray, to remove a part of the vibrating arm on the first principal surface, and in which an activation amount by the energy ray on the second principal surface of the vibrating arm is smaller than an activation amount by the energy ray on the first principal surface of the vibrating arm.

In the frequency adjustment method of the vibration element according to the application example, the vibrating arm may include an arm portion, a weight portion, and a frequency adjustment film provided on the first principal surface of the weight portion, and at least a part of the frequency adjustment film may be irradiated with the energy ray.

In the frequency adjustment method of the vibration element according to the application example, the frequency adjustment film may contain a metal material, and the vibrating arm on the second principal surface of the weight portion contains an oxide material.

In the frequency adjustment method of the vibration element according to the application example, the vibration element may include a pair of the vibrating arms extending in the same direction from the base.

In the frequency adjustment method of the vibration element according to the application example, an area of a region irradiated with the energy ray for one of the vibrating arms may be the same as an area of a region irradiated with the energy ray for the other vibrating arm, in a plan view in a thickness direction of the base.

A manufacturing method of the vibration element according to an application example includes the frequency adjustment method of the vibration element according to the application example.

A vibration element according to an application example includes a base and a vibrating arm having a first principal surface and a second principal surface that extend from the base and are in a front and back relationship with each other, and in which an activation amount of the vibrating arm of the second principal surface when an energy ray is radiated is smaller than an activation amount of the vibrating arm of the first principal surface when the energy ray is radiated.

A physical quantity sensor according to an application example includes the vibration element according to the application example and a package accommodating the vibration element.

An inertial measurement device according to an application example includes the physical quantity sensor according to the application example and a circuit electrically connected to the physical quantity sensor.

An electronic apparatus according to an application example includes the vibration element according to the application example and a circuit for outputting a drive signal to the vibration element.

A vehicle according to an application example includes the vibration element according to the application example and a body on which a physical quantity sensor including the vibration element is mounted.

BRIEF DESCRIPTION OF THE DRAWINGS

The invention will be described with reference to the accompanying drawings, wherein like numbers reference like elements.

FIG. 15 is a perspective view illustrating an embodiment (automobile) of a vehicle according to the invention.

DESCRIPTION OF EXEMPLARY EMBODIMENTS

Hereinafter, preferred embodiments of a frequency adjustment method of a vibration element, a manufacturing method of the vibration element, the vibration element, the physical quantity sensor, an inertial measurement device, an electronic apparatus, and a vehicle will be described in detail with reference to the accompanying drawings. In each drawing, there are places which are displayed as being enlarged or reduced as appropriate, and schematically illustrated so that the parts to be described are in a recognizable state.

1. Physical Quantity Sensor

First, prior to describing a frequency adjustment method of a vibration element and a manufacturing method of the vibration element according to an embodiment, a physical quantity sensor including the vibration element according to the embodiment will be briefly described.

Figure 1:
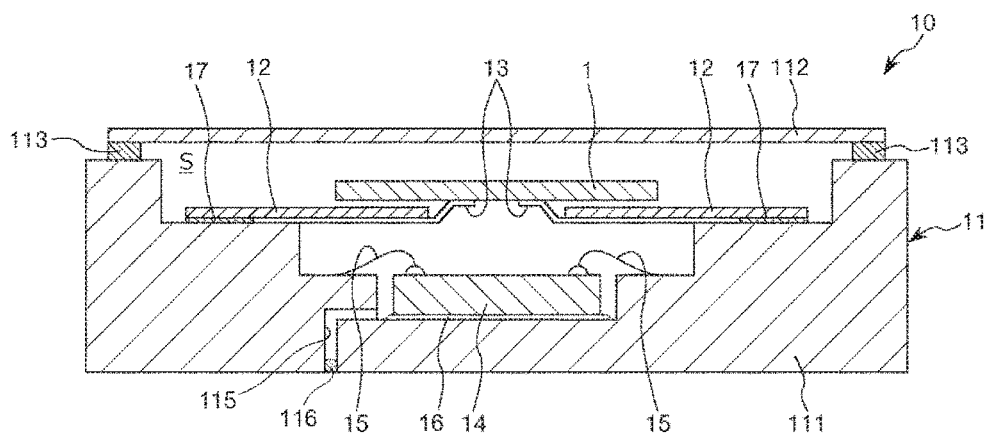
FIG. 1 is a cross-sectional view illustrating a physical quantity sensor including a vibration element according to an embodiment.

FIG. 1 is a cross-sectional view illustrating a physical quantity sensor including a vibration element according to an embodiment.

A physical quantity sensor 10 illustrated in FIG. 1 includes a vibration element 1, a package 11 for accommodating the vibration element 1, a support substrate 12 supporting the vibration element 1 with respect to the package 11 and a wiring pattern 13, and a circuit element 14 disposed within the package 11.

The package 11 includes a box-like base 111 having a recess for accommodating the vibration element 1 and a plate-like lid 112 joined to the base 111 through a joining member 113 so as to close an opening of the recess of the base 111. A space S which is a closed space in the package 11 may be at a reduced pressure or in vacuum state or may be filled with an inert gas such as nitrogen, helium, argon or the like. A through-hole 115 as a sealing hole is provided at the bottom of the base 111, and the through-hole 115 is sealed with, for example, a sealing material 116 formed using various glass materials, metal materials, and the like. In addition, after a part of the lid 112 of the package 11 is formed into a recessed shape and the lid 112 and a seam ring are joined to each other, sealing may be performed by irradiating the recessed portion of the lid with a laser.

The recess of the base 111 has an upper stage surface positioned on the opening side, a lower stage surface positioned on the bottom side, and a middle stage surface positioned between the upper stage surface and the lower stage surface. Although a constituent material of the base 111 is not particularly limited, various ceramics such as aluminum oxide and various glass materials can be used as the constituent material. In addition, the constituent material of the lid 112 is not particularly limited, but is preferably a material having a linear expansion coefficient close to that of the constituent material of the base 111. For example, in a case where the constituent material of the base 111 is ceramics as described above, it is preferable to use an alloy such as kovar as the constituent material. In this embodiment, a seam ring is used as the joining member 113, but the joining member 113 may be configured by using, for example, low melting point glass, an adhesive, or the like.

A plurality of connection terminals (not illustrated) are provided on each of the upper stage surface and the middle stage surface of the recess of the base 111. Among the plurality of connection terminals provided on the middle stage surface, some of the plurality of connection terminals are electrically connected to terminals (not illustrated) provided on the bottom surface of the base 111 through a wiring layer (not illustrated) provided on the base 111 and the remaining connection terminals are electrically connected to a plurality of connection terminals provided on the upper stage through wirings (not illustrated). These connection terminals are not particularly limited as long as they have conductivity, but, for example, the connection terminals are configured by metallic coating obtained by laminating each coating of Ni (nickel), Au (gold), Ag (silver), Cu (copper), and the like on the underlayer of a metallization layer of Cr (chromium), W (tungsten), and the like.

The circuit element 14 is fixed to the lower stage surface of the recess of the base 111 with an adhesive 16 or the like. As the adhesive 16, for example, an epoxy-based, silicone-based, or polyimide-based adhesive can be used. The circuit element 14 includes a plurality of terminals (not illustrated), and these terminals are electrically connected to respective connection terminals provided on the middle stage surface described above by a conductive wire 15. This circuit element 14 includes a drive circuit for causing the vibration element 1 to be subjected to drive vibration and a detection circuit for detecting detection vibration occurring in the vibration element 1 when an angular velocity is applied.

The wiring pattern 13 is connected to a plurality of connection terminals provided on the upper stage surface of the recess of the base 111 through a conductive adhesive 17. The wiring pattern 13 is joined to the support substrate 12. As the conductive adhesive 17, for example, an epoxy-based, silicone-based, polyimide-based conductive adhesive, or the like mixed with a conductive material such as a metal filler can be used.

The support substrate 12 has an opening at the center portion thereof, and a plurality of long leads of the wiring pattern 13 extend within the opening. The vibration element 1 is connected to the tip end portion of these leads through a conductive bump (not illustrated).

In this embodiment, the circuit element 14 is provided inside the package 11, but the circuit element 14 may be provided outside the package 11.

2. Vibration Element

Figure 2:
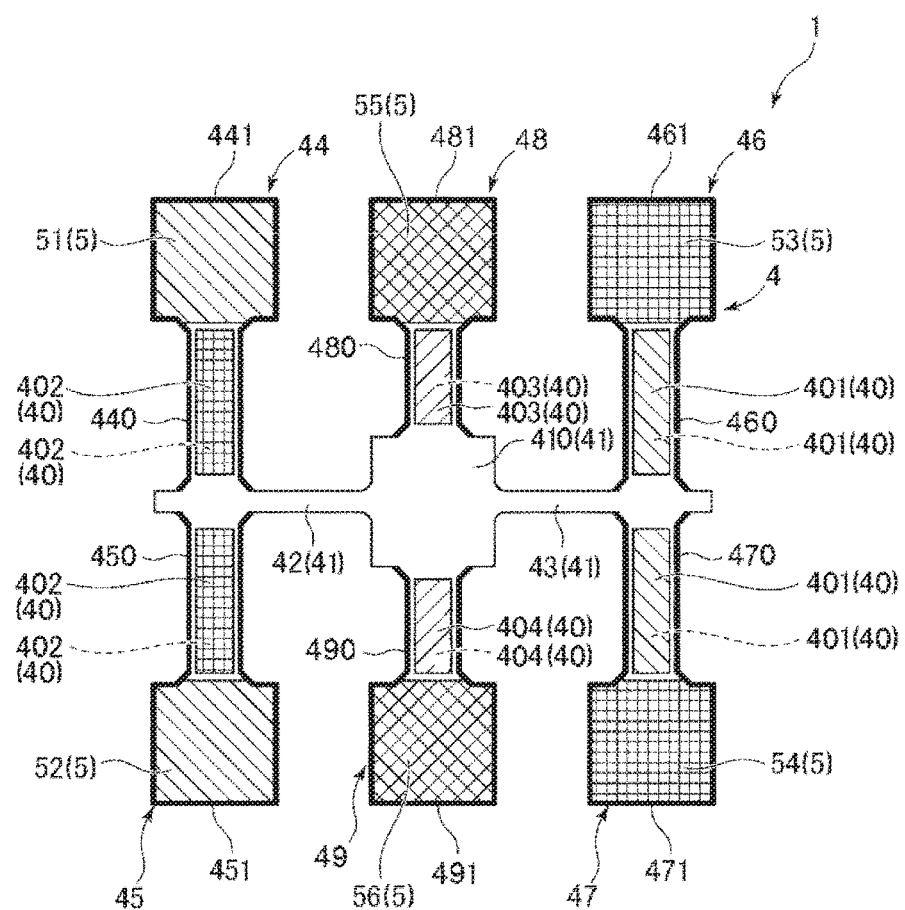
FIG. 2 is a plan view of the vibration element.
Figures 3, 4:
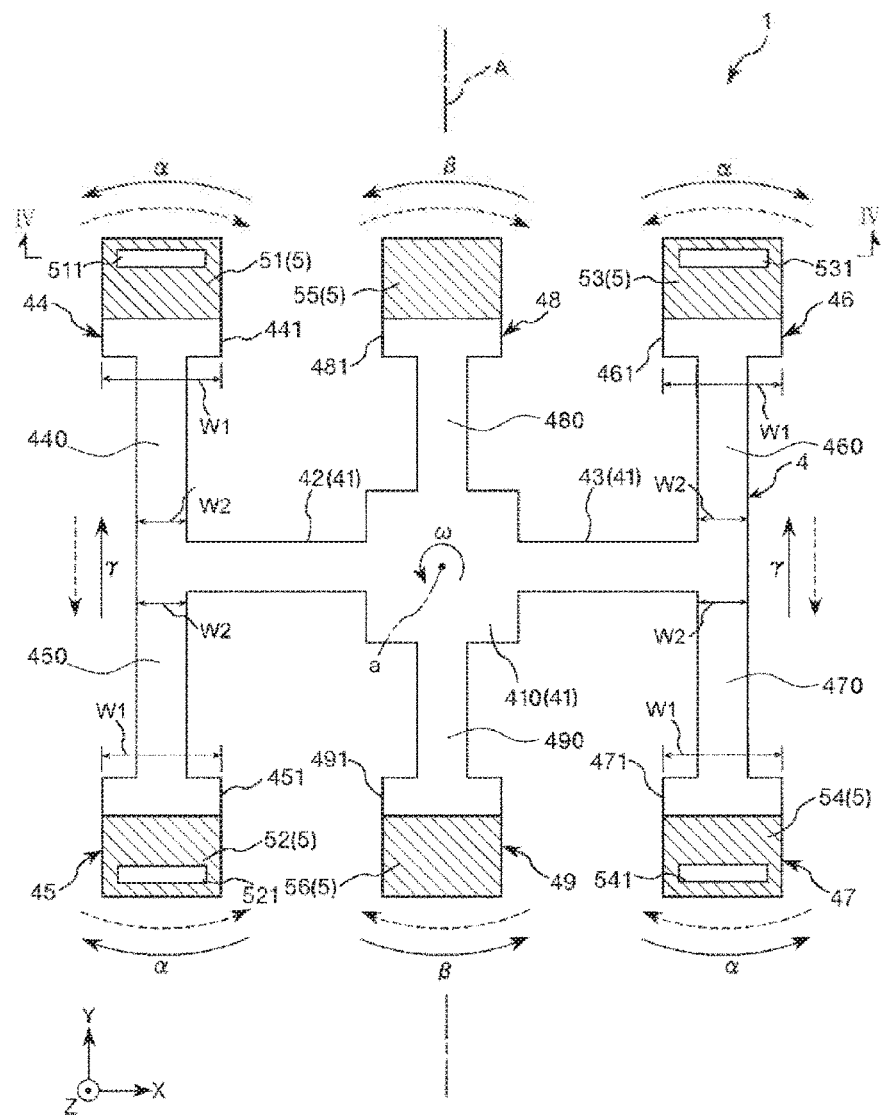
FIG. 3 is a plan view of the vibration element and is a view for explaining an operation of the vibration element.
FIG. 4 is a cross-sectional view taken along line IV-IV in FIG. 3.

FIG. 2 is a plan view of the vibration element. FIG. 3 is a plan view of the vibration element and is a view for explaining the operation of the vibration element. FIG. 4 is a cross-sectional view taken along line IV-IV in FIG. 3. In FIGS. 2 and 3, for convenience of explanation, the X-axis, the Y-axis, and the Z-axis are illustrated as three axes orthogonal to each other, the tip end side of the arrow indicating each axis is assumed as "+", and the base end side thereof is assumed as "−". A direction parallel to the X-axis is referred to as an "X-axis direction", a direction parallel to the Y-axis as a "Y-axis direction", and a direction parallel to the Z-axis as a "Z-axis direction". The +Z-axis direction side is also referred to as "upper", and the −Z-axis direction side is also referred to as "lower". Further, in this embodiment, the X-axis, the Y-axis, and the Z-axis correspond to the electric axis, the mechanical axis, and the optical axis which are crystal axes of the quartz crystal, respectively.

The vibration element 1 illustrated in FIGS. 2 and 3 is a sensor element for measuring an angular velocity ω around the Z-axis. The vibration element 1 includes a vibrating body 4, an electrode film pattern (not illustrated) and weight film patterns 5 formed on the surface of the vibrating body 4. In FIG. 3 and FIG. 4, illustration of the electrode film pattern is omitted.

Vibrating Body

The vibrating body 4 is formed in a plate shape which has spread in the XY-plane defined by the Y-axis (machine axis) and the X-axis (electric axis) which are the crystal axes of the quartz crystal substrate, and has a thickness in the Z-axis (optical axis) direction. That is, the vibrating body 4 is configured by a Z-cut quartz crystal plate. The Z-axis does not necessarily have to coincide with the thickness direction of the vibrating body 4 and may be slightly inclined with respect to the thickness direction from a viewpoint of reducing change in frequency due to temperature in the vicinity of ordinary temperature. Specifically, the Z-cut quartz crystal plate includes a quartz crystal plate having a cut angle such that a surface orthogonal to the Z-axis is rotated in the range of 0 degrees or more and 10 degrees or less around at least one of the X-axis and the Y-axis to become a principal surface. The vibrating body 4 may be a member not having piezoelectricity such as silicon, and in this case, a piezoelectric element may be appropriately provided on the vibrating body 4.

The vibrating body 4 of this embodiment has a so-called double T shape. The vibrating body 4 includes a base portion main body 410, a pair of connecting arms 42 and 43 extending from the base portion main body 410, two drive vibration arms 44 and 45 extending from the connecting arm 42, two drive vibration arms 46 and 47 extending from the connecting arm 43, and two detection vibration arms 48 and 49 extending from the base portion main body 410. The base portion 41 is configured by the base portion main body 410 and the pair of connecting arms 42 and 43.

The vibrating body 4 is symmetrically formed on the left and right sides in FIG. 2. In this embodiment, the vibrating body 4 includes a pair of drive vibration arms 44 and 46 which are parallel to each other and extend in the +Y-axis direction which is the same direction with respect to the base portion 41, and a pair of drive vibration arms 45 and 47 which are parallel to each other and extend in the −Y-axis direction which is the same direction with respect to the base portion 41. That is, in this embodiment, two sets of "a pair of vibrating arms" are provided.

The base portion 41 is fixed to the base 111 of the package 11 through the support substrate 12 and the wiring pattern 13 described above.

The connecting arms 42 and 43 extend in opposite directions to each other from the base portion 41 along the X-axis direction. Grooves or holes extending in the length direction of the connecting arms 42 and 43, that is, in the X-axis direction may be provided on the upper and lower surfaces of the connecting arms 42 and 43, respectively.

The drive vibration arms 44 and 45 extend in opposite directions to each other from the tip end portion of the connecting arm 42 along the Y-axis direction. Similarly, the drive vibration arms 46 and 47 extend in opposite directions to each other from the tip end portion of the connecting arm 43 along the Y-axis direction.

In this embodiment, the drive vibration arms 44, 45, 46, and 47 include arm portions 440, 450, 460, and 470 positioned on the base portion 41 side and weight portions 441, 451, 461, and 471 positioned closer to the tip end side than the arm portions 440, 450, 460, and 470, that is, on the side opposite to the base portion 41. A width W1 of the weight portions 441, 451, 461, and 471 is wider than a width W2 of the arm portions 440, 450, 460, and 470. As will be described later, grooves or holes extending in the extending direction of the drive vibration arms 44 to 47 may be provided on the upper surfaces and the lower surfaces of the drive vibration arms 44 to 47, respectively.

The detection vibration arms 48 and 49 extend from the base portion 41 in opposite directions to each other along the Y-axis direction.

In this embodiment, the detection vibration arms 48 and 49 include arm portions 480 and 490 positioned on the side of the base portion 41 and weight portions 481 and 491 positioned closer to the tip end side than the arm portions 480 and 490, that is, on the side opposite to the base portion 41. The width of the weight portions 481 and 491 is wider than the width of the arm portions 480 and 490. Grooves or holes extending in the extending direction of the detection vibration arms 48 and 49 may be provided on the upper and lower surfaces of the detection vibration arms 48 and 49, respectively.

Electrode Film Pattern

As illustrated in FIG. 2, the electrode film pattern 40 provided on the front surface of the vibrating body 4 described above includes drive signal electrodes 401 and drive ground electrodes 402 provided on the arm portions 440, 450, 460, and 470 of the drive vibration arms 44 to 47, detection signal electrodes 403 and 404 and detection ground electrodes (not illustrated) provided on the arm portions 480 and 490 of the detection vibration arms 48 and 49, and a plurality of terminals provided on the base portion 41 corresponding to these electrodes.

Drive signal electrodes 401 are electrodes for exciting drive vibration of the drive vibration arms 44 to 47. The drive signal electrodes 401 are provided on the upper and lower surfaces of the arm portion 460 (see FIG. 2) and on both side surfaces (not illustrated) of the arm portion 440, respectively. Similarly, the drive signal electrodes 401 are provided on the upper and lower surfaces of the arm portion 470 (see FIG. 2) and on both side surfaces (not illustrated) of the arm portion 450, respectively.

On the other hand, each drive ground electrode 402 has potential serving as reference potential, for example, ground potential, with respect to the drive signal electrode 401. The drive ground electrodes 402 are provided on both side surfaces (not illustrated) of the arm portion 460 and upper and lower surfaces (see FIG. 2) of the arm portion 440, respectively. Similarly, the drive ground electrodes 42 are provided on both side surfaces (not illustrated) of the arm portion 470 and the upper and lower surfaces (see FIG. 2) of the arm portion 450, respectively.

The detection signal electrodes 403 are electrodes for detecting an electric charge generated by detection vibration of the detection arm 48 when the detection vibration is excited. The detection signal electrodes 403 are provided on the upper and lower surfaces (see FIG. 2) of the arm portion 480.

On the other hand, each detection ground electrode (not illustrated) has potential serving as reference potential with respect to the detection signal electrode 403, for example, a ground potential. The detection ground electrodes are provided on both side surfaces (not illustrated) of the arm portion 480.

The detection signal electrodes 404 are electrodes for detecting the electric charge generated by detection vibration of the detection arm 49 when the detection vibration is excited. The detection signal electrodes 404 are provided on the upper and lower surfaces (see FIG. 2) of the arm portion 490.

On the other hand, each detection ground electrode (not illustrated) has potential serving as reference potential with respect to the detection signal electrode 404, for example, a ground potential. The detection ground electrodes are provided on both side surfaces (not illustrated) of the arm portion 490.

The vibration may be detected by a differential signal between each detection signal electrode 403 of the detection arm 48 and each detection signal electrode 404 of the detection arm 49.

Weight Film Pattern

The weight film patterns 5 are disposed on portions of the electrode film patterns 40 provided at the tip end portions of the drive vibration arms 44, 45, 46 and 47, respectively. As illustrated in FIG. 3, a plurality of weight film patterns 5 includes weight films 51, 52, 53, and 54 provided on the weight portions 441, 451, 461, and 471 positioned at the tip end portions of the drive vibration arms 44, 45, 46, and 47, respectively, and weight films 55 and 56 provided on the weight portions 481 and 491 positioned at the tip end portions of the detection vibration arms 48 and 49, respectively. In FIG. 3, illustration of the electrode film pattern 40 is omitted.

The weight films 51 to 54 have a function of adjusting the resonance frequencies of the drive vibration arms 44 to 47, respectively. The weight films 55, 56 have a function of adjusting the resonance frequencies of the detection vibration arms 48 and 49, respectively.

The weight films 51 to 54 illustrated in FIG. 3 illustrates a state after adjustment of the resonance frequencies of the drive vibration arms 44 to 47 as will be described later. For this reason, as illustrated in FIG. 3, parts of the weight films 51 to 54 are removed. Accordingly, the weight portion 441 has a recess 511 formed by removing a part of the weight film 51. The weight portion 451 has a recess 521 formed by removing a part of the weight film 52. The weight portion 461 has a recess 531 formed by removing a part of the weight film 53. Further, the weight portion 471 has a recess 541 formed by removing a part of the weight film 54. As such, by removing a part of each of the weight films 51 to 54, the resonance frequency of each of the drive vibration arms 44 to 47 can be appropriately adjusted, and the leakage vibration can be removed.

The recesses 511, 521, 531, and 541 may be formed as needed, and at least one or all of the recesses 511, 521, 531, and 541 may be omitted when adjusting the resonance frequency.

The constituent material of such weight films 51 to 56 is not particularly limited, and, for example, metal, an inorganic compound, resin or the like can be used, but it is preferable to use metal or an inorganic compound. The metal or the inorganic compound can be deposited easily and highly accurately to form a film by a vapor phase film formation method. The weight films 51 to 56 made of metal or an inorganic compound can be efficiently and highly accurately removed by irradiation with energy ray. Thus, by forming the weight film patterns 5 with metal or an inorganic compound, the frequency adjustment described later becomes more efficient and highly accurate.

As such a metal material, for example, a simple substance such as nickel (Ni), gold (Au), platinum (Pt), aluminum (Al), silver (Ag), chromium (Cr), copper (Cu), molybdenum (Mo), niobium (Nb), tungsten (W), iron (Fe), titanium (Ti), cobalt (Co), zinc (Zn), zirconium (Zr), or the like, or an alloy containing at least one of these elements is included, and one type or two or more types of the elements and alloy can be used in combination. Among the elements and alloy, from the viewpoint that it can be collectively formed with the drive electrode and the detection electrode, Al, Cr, Fe, Ni, Cu, Ag, Au, or Pt or an alloy containing at least one of these elements is preferably used as such a metal material.

Examples of such inorganic compounds include oxide ceramics such as alumina (aluminum oxide), silica (silicon oxide), titania (titanium oxide), zirconia, yttria, calcium phosphate and the like, nitride ceramics such as silicon nitride, aluminum nitride, titanium nitride, and boron nitride, carbide-based ceramics such as graphite and tungsten carbide and in addition, ferroelectric materials such as barium titanate, strontium titanate, PZT, PLZT, PLLZT and the like are included, among which, insulating materials such as silicon oxide ($SiO_2$), titanium oxide ($TiO_2$), aluminum oxide ($Al_2O_3$) and the like are preferably used.

Specifically, it is preferable that the weight films 51 to 56 have a configuration in which an upper layer containing Au (gold) is laminated on an underlayer containing, for example, Cr (chromium). With this configuration, adhesion to the vibrating body 4 which is formed using quartz crystal is excellent, and adjustment of the resonance frequency can be performed with high accuracy and efficiency.

An average thickness of each of the weight films 51 to 56 is not particularly limited, but is, for example, approximately 10 nm or more and 10000 nm or less.

In the vibration element 1 described above, when an electric field is generated between the drive signal electrode to which the drive signal is input and the drive ground electrode in a state where the angular velocity is not applied to the vibration element 1, each of the drive vibration arms 44 to 47 performs flexural vibration, that is, drive vibration in the direction indicated by the arrow α in FIG. 3. At this time, since the drive vibration arms 44 and 45 and the drive vibration arms 46 and 47 perform bilaterally symmetrical vibrations in FIG. 3, the base portion 41 and the detection vibration arms 48 and 49 hardly vibrate.

In a state where the drive vibration is performed, when the angular velocity ω around an axis a along the Z-axis is applied to the vibration element 1, detection vibration, that is, vibration in a detection mode is excited. Specifically, the Coriolis force in the direction indicated by the arrow γ in FIG. 3 acts on the drive vibration arms 44 to 47 and the connecting arms 42 and 43, and new vibration is excited. In accordance with this excitation of vibration, detection vibration in the direction indicated by the arrow β in FIG. 3 is excited on the detection vibration arms 48 and 49 so as to cancel vibration of the connecting arms 42 and 43. Electric charges generated in the detection vibration arms 48 and 49 by this detection vibration are taken out as detection signals from the detection signal electrode, and an angular velocity is obtained based on this detection signal.

3. Manufacturing Method Physical Quantity Sensor

Next, a manufacturing method of a physical quantity sensor including a manufacturing method of a vibration element will be described by taking a case of manufacturing a physical quantity sensor 10 described above as an example.

Figure 5:
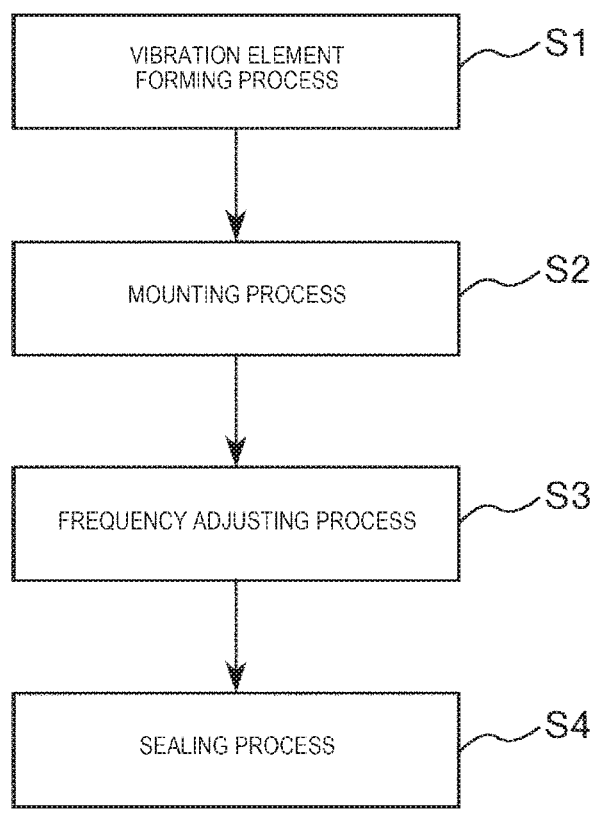
FIG. 5 is a flowchart for explaining an example of a manufacturing method of the vibration element.

FIG. 5 is a flowchart for explaining an example of the manufacturing method of the vibration element. As illustrated in FIG. 5, the manufacturing method of the physical quantity sensor 10 includes processes of a vibration element forming process [1] (step S1), a mounting process [2] (step S2), a frequency adjusting process [3] (step S3), and a sealing process [4] (step S4). Here, the manufacturing method of the physical quantity sensor 10 includes a frequency adjustment method of the vibration element 1 and a manufacturing method of the vibration element 1. The frequency adjustment method of the vibration element 1 includes at least process [3] among the processes [1] to [4]. The manufacturing method of the vibration element 1 includes at least the process [1] and process [3] among the processes [1] to [4]. Hereinafter, each process will be described in sequence.

[1] Vibration Element Forming Process (Step S1).

Figure 6:
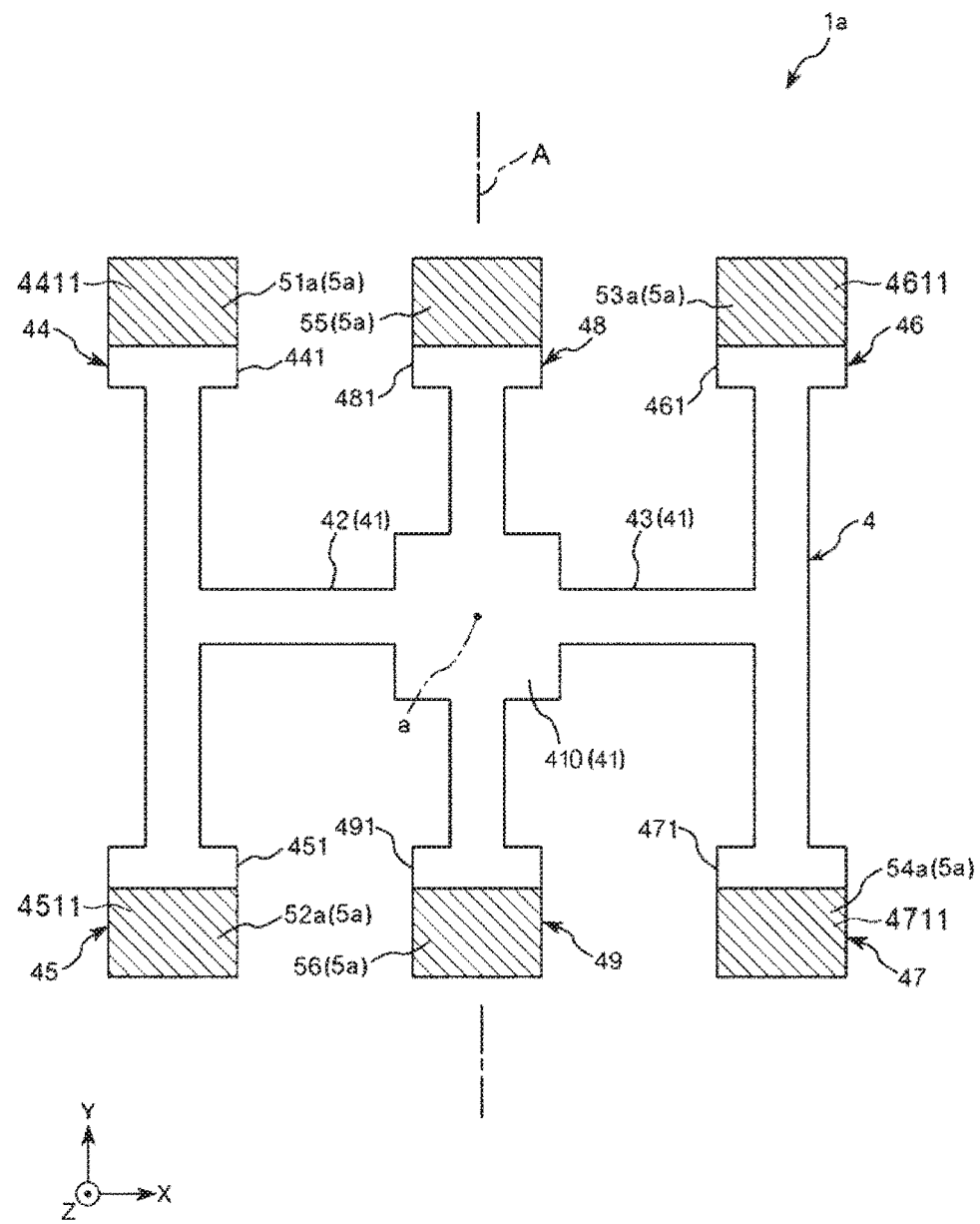
FIG. 6 is a top view of the vibration element obtained through a vibration element forming process.
Figure 7:
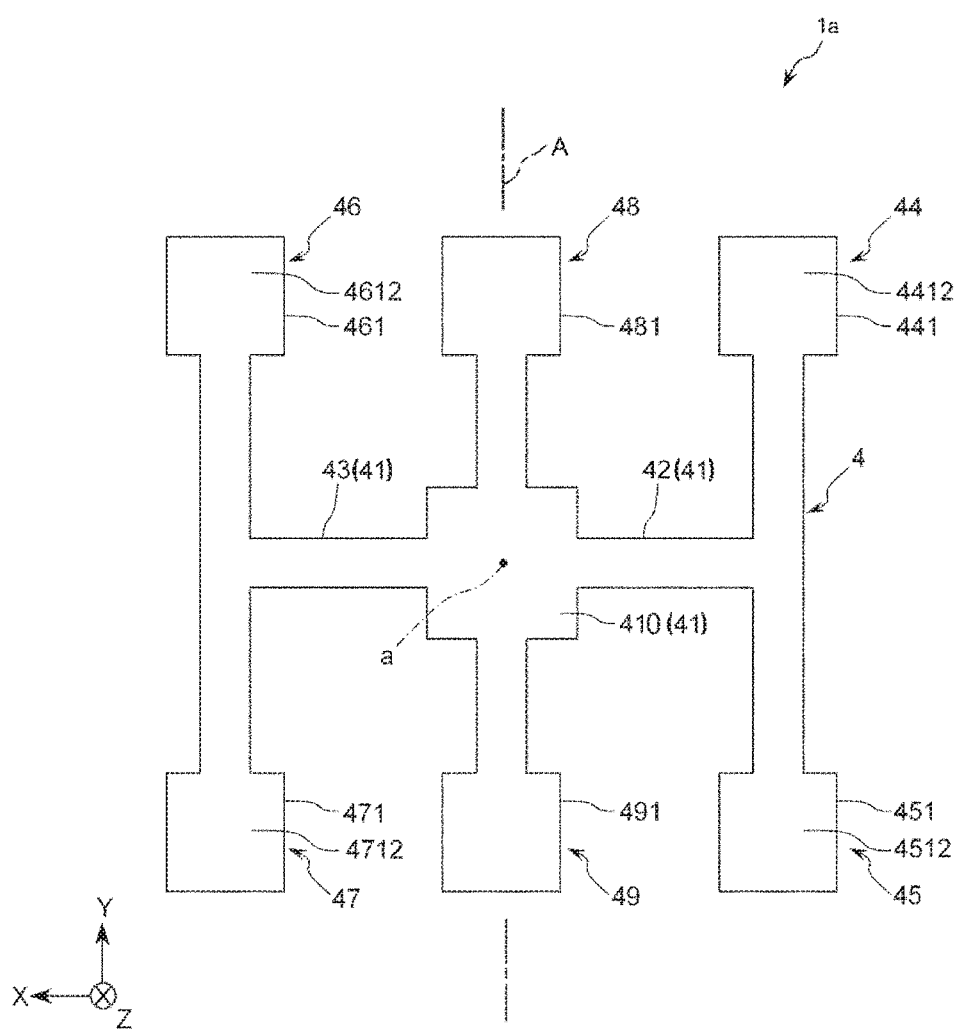
FIG. 7 is a bottom view of the vibration element obtained through the vibration element forming process.

FIG. 6 is a top view of the vibration element obtained through the vibration element forming process. FIG. 7 is a bottom view of the vibration element obtained through the vibration element forming process.

First, as the vibration element before frequency adjustment, a vibration element 1a illustrated in FIG. 6 is formed. That is, in this process, as illustrated in FIG. 6, the vibration element 1a which has a weight film pattern 5a including weight films 51a, 52a, 53a, and 54a and the weight films 55 and 56 before the recesses 511, 521, 531, and 541 are formed is formed.

Specifically, for example, first, a quartz crystal substrate which is a base material of the vibrating body 4 is prepared, a photoresist is applied on one surface of the quartz crystal substrate, and the quartz crystal substrate is subjected to exposure and development to a shape corresponding to the vibrating body 4 to obtain a resist mask (not illustrated). Next, in the state where the resist mask is formed, a Cr layer and an Au layer are formed in this order on both surfaces of the quartz crystal substrate by, for example, a vapor deposition method, a sputtering method or the like and a Ni layer is formed on the Au layer by, for example, a plating method or the like. Thereafter, the resist mask is removed by, for example, etching or the like to obtain a mask.

Next, the quartz crystal substrate is subjected to dry etching by reactive ion etching RIE using, for example, $C_4F_8$ as an etching gas through the mask from one surface side of the quartz crystal substrate. Thus, the vibrating body 4 is formed. At this stage, the vibrating body 4 is in a state of being connected to another part of the quartz crystal substrate, that is, "wafer state". In this wafer state, the vibrating body 4 is connected to other parts of the quartz crystal substrate through, for example, a folding portion of which at least one of the width and thickness is small and weakly formed. In addition, in the wafer state, a plurality of vibration elements 1 can be collectively formed on the quartz crystal substrate.

Thereafter, a metal film is uniformly formed on the front surface of the vibrating body 4 by a film deposition method such as sputtering. Then, a photoresist is applied to the metal film, and exposure and development are performed thereon to obtain a resist mask, and then the metal film in the portion exposed from the resist mask is removed using an etching solution. With this configuration, an electrode film pattern is formed.

Next, the weight film pattern 5a is formed on the electrode film pattern by, for example, mask deposition.

By doing as described above, the vibration element 1a is formed.

After the vibration element 1a is formed, a detuning frequency adjusting process of adjusting a detuning frequency which is a difference between the resonance frequencies of the detection vibration arms 48 and 49 and the resonance frequencies of the drive vibration arms 44 to 47 can be performed as needed. In the detuning frequency adjusting process, for example, each of the resonance frequencies of the detection vibration arms 48 and 49 and the drive vibration arms 44 to 47 is measured, and at least a part of each of the weight films 55 and 56 is removed based on the measurement result. In some cases, a part of the weight films 51, 52, 53, and 54 of the drive vibration arms may be removed. With this configuration, it is possible to adjust the detuning frequency by adjusting the resonance frequencies of the detection vibration arms 48 and 49 or the resonance frequencies of the drive vibration arms 44 to 47.

Further, this process may be a process of preparing the vibration element 1a formed by another method.

[2] Mounting Process (Step S2)

Next, although not illustrated, the vibration element 1a which is in the wafer state is cut off from the quartz crystal substrate. This is, for example, a process of folding and taking away the folding portion. Then, the vibration element 1a is mounted on the base 111 of the package 11 described above (see FIG. 1). In this process, the lid 112 is not joined to the base 111. Further, in this process, the circuit element 14 is fixed to the lower stage surface of the recess of the base 111 with the adhesive 16, and the wiring pattern 13 is connected to a plurality of connection terminals provided on the upper stage surface of the recess of the base 111 by the conductive adhesive 17 (see FIG. 1).

[3] Frequency Adjusting Process (Step S3)

Figure 8:
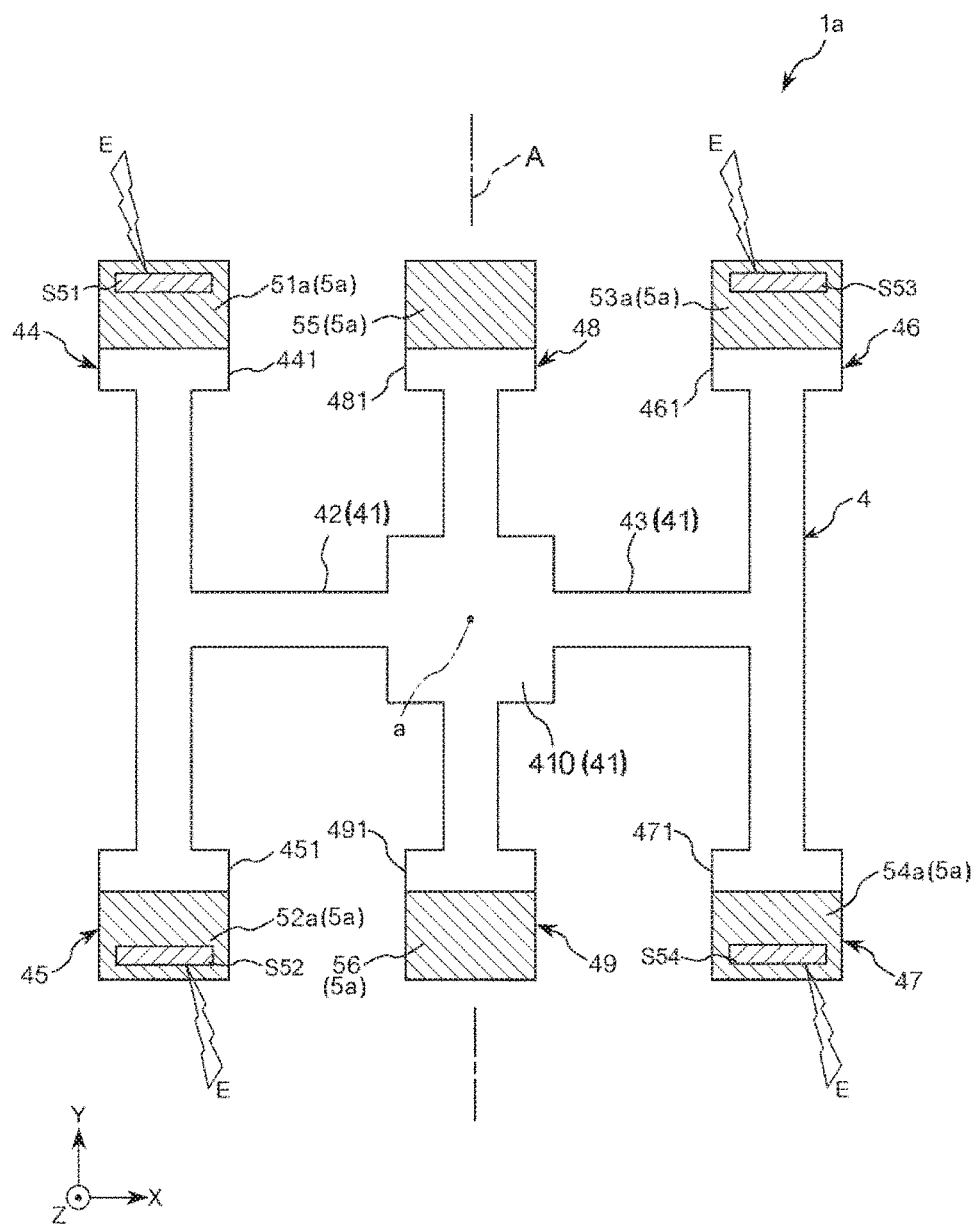
FIG. 8 is a top view of the vibration element in a frequency adjusting process.

FIG. 8 is a top view of the vibration element in the frequency adjusting process.

Next, a part of each of the weight films 51a to 54a is removed so as to adjust the vibration leakage amount so that the resonance frequencies of the drive vibration arms 44 to 47 become equal to each other. Here, the "vibration leakage amount" means the magnitude of the signal output from the detection vibration arms 48 and 49, that is, an offset or zero point signal when the drive vibration arms 44 to 47 are subjected to drive vibration and rotation is not applied.

In this process, first, the resonance frequencies of the drive vibration arms 44 to 47 are measured. Further, by removing a specified amount of a part of at least one of the weight films 51a to 54a and measuring a change amount in the drive frequency according to the specified amount, the change amount in the drive frequency with respect to a machining amount is obtained. Measurement of the resonance frequencies of the drive vibration arms 44 to 47 and obtainment of the change amount in the drive frequency are performed for each of the plurality of vibrating bodies 4.

Next, based on the measurement result of the resonance frequencies of the drive vibration arms 44 to 47 and the change amount in the drive frequency with respect to the machining amount, as illustrated in FIG. 8, a part of each of the weight films 51a to 54a is irradiated with an energy ray E to remove a part of each of the weight films 51a to 54a so that the resonance frequencies of the drive vibration arms 44 to 47 are made equal to each other. With this configuration, the recesses 511, 521, 531, and 541 are formed as illustrated in FIG. 3. As a result, the mass of the weight films 51a to 54a decreases, and the resonance frequencies of the drive vibration arms 44 to 47 can be adjusted.

As the energy ray E, for example, it is preferable to use an excimer laser which is an example of a laser having a pulse width of 1 picosecond (ps) or less, or an ion beam or the like. In particular, it is preferable to use an ion beam such as the focused ion beam (FIB) or the ion beam figuring (IBF). Further, by using the FIB, fine machining can be performed with higher accuracy. By using the IBF, fine machining can be performed quickly, so that productivity can be enhanced.

As illustrated in FIG. 8, regions S51, S52, S53, and S54 to be irradiated with the energy ray E are, for example, regions positioned on the tip end sides of the upper surfaces of the weight portions 441, 451, 461, and 471, respectively. The regions S51 and S53 are preferably positioned in line-symmetric positions to each other when a line segment A passing through the center of the base portion main body 410 is set as an axis of symmetry. Similarly, the region S52 and the region S54 are preferably positioned in line-symmetric positions to each other when the line segment A passing through the center of the base portion main body 410 is set as the axis of symmetry. The regions S51 to S54 preferably have the same shape and the same area as each other in a plan view. An area of each of the regions S51 to S54 in a plan view is, for example, approximately 1 $\mu m^2$ to 20000 $\mu m^2$.

Further, it is preferable to set the irradiation time, irradiation amount or output of the energy ray E for each of the regions S51 to S54 based on the measurement result of the resonance frequencies of the drive vibration arms 44 to 47 and the change amount of the drive frequency with respect to the machining amount. With this configuration, it is possible to match the resonance frequencies of the drive vibration arms 44 to 47 with high accuracy. In this embodiment, as an example, the irradiation time, irradiation amount, or output of the energy ray E to the regions S51 and S52 are set to be larger than those to the regions S53 and S54.

In the manner described above, the vibration element 1 illustrated in FIG. 1 is formed. In this embodiment, as an example, a depth d1 of the recess 511 of the drive vibration arm 44 is formed to be deeper than a depth d3 of the recess 531 of the drive vibration arm 46 (see FIG. 4). Although not illustrated, as an example, a depth d2 of the recess 521 of the drive vibration arm 45 is formed to be deeper than a depth d4 of the recess 541 of the drive vibration arm 47. A relation of magnitude between the depths d1 and d3 and a relation of magnitude between the depths d2 and d4 each may be reversed. As a result, the depths of the recesses 511, 521, 531, and 541 may be equal to each other. Furthermore, the recesses 511, 521, 531, and 541 may be provided as necessary, and there may be cases where the recesses 511, 521, 531, and 541 are not formed at all.

A structure for suppressing wraparound of the energy ray E or the like may be provided on the drive vibration arms 44 and 45, 46 and 47, as needed. As such a structure, for example, a structure protruding from side surfaces of the weight portions 441, 451, 461, and 471, that is, surfaces parallel to the Y-axis, and a tip end surface, that is, surfaces parallel to the X-axis may be included. By providing such a structure, it is possible to shield the energy ray E to wrap around, and to suppress unintended irradiation of the energy ray E.

It is also useful to sufficiently reduce a beam size of the energy ray E, as needed. That is, the energy ray E may be condensed to a sufficiently small size, or an opening of the mask for limiting the irradiation region may be made sufficiently small. With this configuration, it is possible to suppress unintended irradiation of the energy ray E.

The front surfaces of the recesses 511, 521, 531, and 541 of the vibration element 1 are in a state where the dangling bonds are exposed by irradiation with the energy ray E, and are in a chemically active state.

[4] Sealing Process (Step S4)

Next, the lid 112 is joined to the base 111 by the joining member 113, and the recess of the base 111 is sealed. With this configuration, the vibration element 1 is accommodated in the package 11. In the sealing process, after the lid 112 is joined, the interior of the package 11 is sealed in a predetermined environment, for example, in a vacuum state.

Among them, the lid 112 is joined to the base 111 by providing the joining member 113 such as a seam ring on the base 111, placing the lid 112 on the joining member 113, and then performing seam welding of the joining member 113 to the base 111 using, for example, a resistance welding machine.

Figure 9:
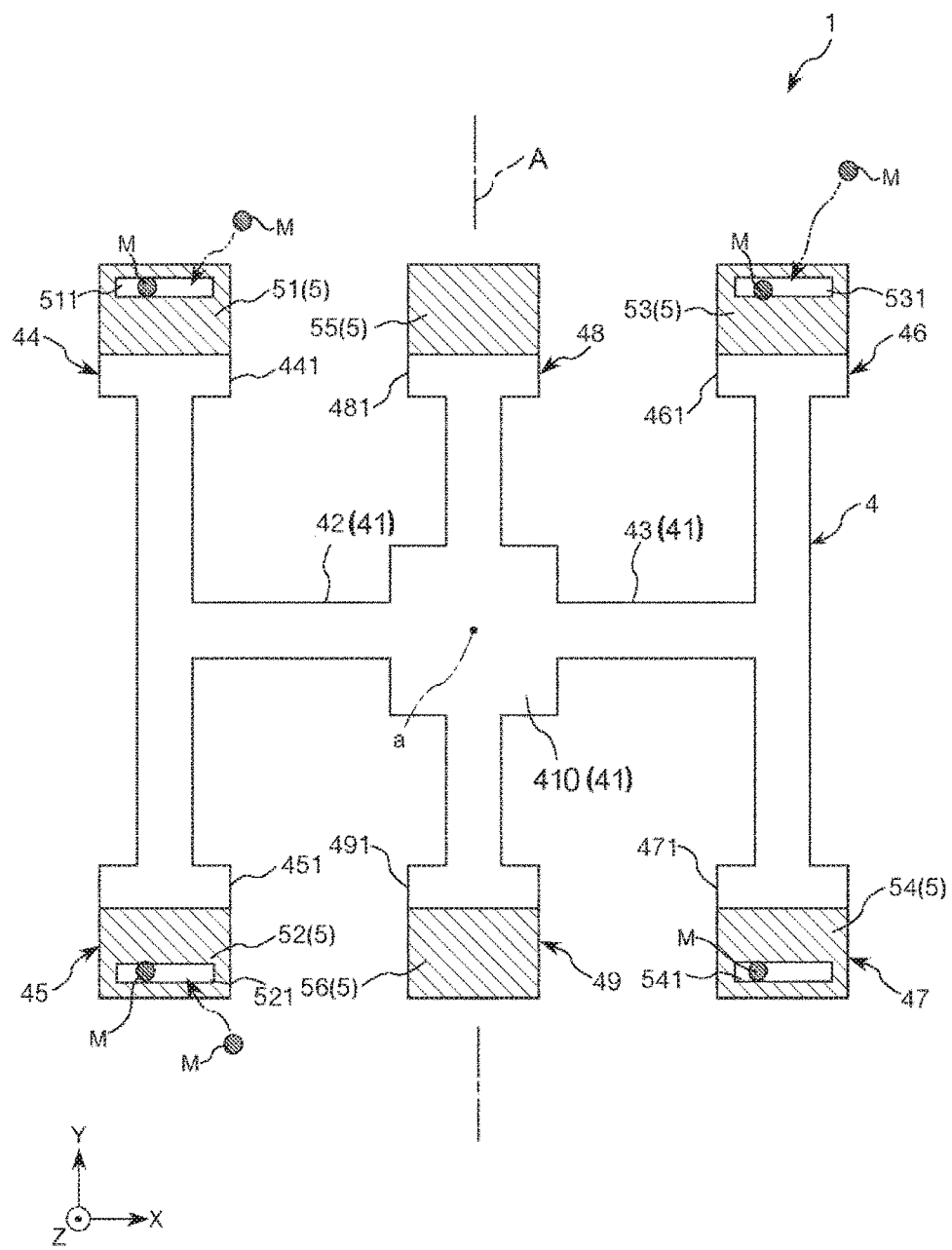
FIG. 9 is a plan view of the vibration element in a sealing process.

FIG. 9 is a plan view of the vibration element in the sealing process.

In this process, gases generated from the adhesive 16 or the conductive adhesive 17 are generated inside the package 11 by seam welding. For example, in a case where a silicone-based adhesive is used for the adhesive 16 or the conductive adhesive 17, the inside of the package 11 is filled with a gas containing silicone. Here, as described above, the front surfaces of the recesses 511, 521, 531, and 541 are in a state where the dangling bonds are exposed, and are in a chemically active state. For that reason, the dangling bonds on the front surfaces of the recesses 511, 521, 531, and 541 are in a state of being easy to be chemically bonded to a substance M such as various organic substances like silicone molecules and moisture contained in the gas generated from the adhesive 16 or the conductive adhesive 17 (see FIG. 9). Therefore, during seam welding, the dangling bonds on the front surfaces of the recesses 511, 521, 531, and 541 and the substance M are bonded in a short time of, for example, approximately several seconds.

Next, gas generated inside the package 11 during seam welding is discharged from the through-hole 115 in a vacuum chamber (not illustrated), and the through-hole 115 is sealed with the sealing material 116 (see FIG. 1).

By doing as described above, the physical quantity sensor 10 can be formed.

Here, since the bonding of the substance M to the recesses 511, 521, 531, and 541 accumulates over time, the bonding causes the resonance frequencies of the drive vibration arms 44 to 47 to change over time. That is, although the recesses 511, 521, 531, and 541 are formed to adjust the resonance frequencies of the drive vibration arms 44 to 47, the recesses 511, 521, 531, and 541 induce bonding of the substance M, and as a result, there is a concern that the vibration balance of the drive vibration arms 44 to 47 deviates with the lapse of time.

In order to solve such a concern, it is conceivable to adjust the areas of the recesses 511, 521, 531, and 541 with each other as described later. That is, even if the substance M is adsorbed in the recesses 511, 521, 531, and 541, it is conceivable that adsorption amounts thereof are difficult to deviate from each other. With this configuration, it is possible to suppress deviation of the vibration balance of the drive vibration arms 44 to 47 to some extent.

However, since the weight films 51a, 52a, 53a, and 54a are basically irradiated with the energy ray E, the lower surfaces of the weight portions 441, 451, 461, and 471 may also be unintentionally irradiated with the energy ray E in some cases due to wraparound of the energy ray E or the like. As a result of such unintended irradiation, the bonding of the substance M is induced not only on the weight films 51a, 52a, 53a, and 54a but also on the lower surfaces of the weight portions 441, 451, 461, and 471. In this case, it is difficult to control the irradiation area of the energy ray E on the lower surfaces of the weight portions 441, 451, 461, and 471 and thus, resultantly, it becomes difficult to control a bonding amount of the substance M, and deviation of the vibration balance of the drive vibration arms 44 to 47 may increase over time.

Therefore, in this embodiment, the activation amount by the energy ray E is made different between the upper surfaces of the weight films 51a, 52a, 53a, and 54a and the lower surfaces of the weight portions 441, 451, 461, and 471 among the drive vibration arms 44 and 45, 46 and 47 of the vibration element 1a.

Specifically, in this embodiment, the upper surfaces of the weight films 51a, 52a, 53a, and 54a among the drive vibration arms 44, 45, 46, and 47 of the vibration element 1a are respectively referred to as "first principal surfaces 4411, 4511, 4611, and 4711", and the lower surfaces thereof are respectively referred to as "second principal surfaces 4412, 4512, 4612, and 4712".

That is, in this embodiment, as illustrated in FIG. 6, the weight films 51a, 52a, 53a, and 54a are provided on parts of the upper surfaces of the weight portions 441, 451, 461, and 471, respectively, and these respective upper surfaces correspond to the "first principal surfaces 4411, 4511, 4611, and 4711". On the other hand, in this embodiment, as illustrated in FIG. 7, the constituent material of the vibrating body 4, such as quartz crystal and the like, is exposed on the entire lower surfaces of the weight portions 441, 451, 461, and 471. That is, a weight film is not provided on the lower surface of each of the weight portions 441, 451, 461, and 471. Accordingly, in this embodiment, the entire lower surfaces of the weight portions 441, 451, 461, and 471 illustrated in FIG. 7 correspond to the "second principal surfaces 4412, 4512, 4612, and 4712".

The first principal surfaces 4411, 4511, 4611, and 4711 and the second principal surfaces 4412, 4512, 4612, and 4712 are made of different constituent materials from each other. Then, when these surfaces are irradiated with the energy ray E, the activation amount by the energy ray E of the second principal surfaces 4412, 4512, 4612, and 4712 is smaller than the activation amount by the energy ray E of the first principal surfaces 4411, 4511, 4611, and 4711.

Such an activation amount by the energy ray E is a physical property value affecting the bonding amount of the substance M. That is, as the activation amount increases, the bonding amount of the substance M also increases. For that reason, as the activation amount increases, the deviation of the vibration balance of the drive vibration arms 44 to 47 over time tends to increase. In addition, the irradiation amount of the energy ray E also affects the bonding amount of the substance M, and the bonding amount of the substance M also increases as the irradiation amount increases.

In view of this, in this embodiment, the activation amount by the energy ray E of the second principal surfaces 4412, 4512, 4612, and 4712 which are the lower surfaces of the weight portions 441, 451, 461, and 471 is made smaller than the activation amount by the energy ray E of the first principal surfaces 4411, 4511, 4611, and 4711 which are the upper surfaces of the weight films 51a, 52a, 53a, and 54a. With this configuration, even if the lower surfaces of the weight portions 441, 451, 461, and 471 are unintentionally irradiated with the energy ray E, binding of the substance M to the lower surface is hardly induced. That is, even if the irradiation amounts of the energy ray E radiated on the second principal surfaces 4412, 4512, 4612, and 4712 are different from each other, in the second principal surfaces 4412, 4512, 4612, and 4712, since the bonding amount of the substance M per unit irradiation amount is small in the first place, deviation of the bonding amount of the substance M is suppressed to be small. In addition, variation in increment of the bonding amount over time is also suppressed to be small. For that reason, it is easy to suppress the deviation of the vibration balance of the drive vibration arms 44 to 47 over time, and occurrence of the vibration leakage can be suppressed.

To summarize the matters described above, the frequency adjustment method of the vibration element according to this embodiment includes the frequency adjusting process of adjusting the resonance frequency of the vibration element 1a by irradiating the vibration element 1a, which includes the base portion 41 and the drive vibration arms 44 to 47 having the first principal surfaces 4411, 4511, 4611, and 4711 and the second principal surfaces 4412, 4512, 4612, and 4712 which extend from the base portion 41 and are in a front and back relationship with each other, with the energy ray E and removing a part of each of the first principal surfaces 4411, 4511, 4611, and 4711, that is, a part of each of upper surfaces of the weight films 51a, 52a, 53a, and 54a to form the recesses 511, 521, 531, and 541. The activation amount by the energy ray E of the second principal surfaces 4412, 4512, 4612, and 4712 of the vibration element 1a is smaller than the activation amount by the energy ray E of the first principal surfaces 4411, 4511, 4611, and 4711.

According to such a method, since it is suppressed that the bonding amount of the substance M varies largely from each other on the second principal surfaces 4412, 4512, 4612, and 4712, even if the second principal surfaces 4412, 4512, 4612, and 4712 are unintentionally irradiated with the energy ray E, deviation in the vibration balance of the drive vibration arms 44 to 47 over time is easily suppressed. As a result, occurrence of the vibration leakage in the vibration element 1 can be suppressed.

The vibration element 1a includes the base portion and the drive vibration arms 44 to 47 having first principal surfaces 4411, 4511, 4611, and 4711 and second principal surfaces 4412, 4512, 4612, and 4712 which extend from the base portion 41 and are in a front and back relationship with each other, and the activation amount by the energy ray E of the second principal surfaces 4412, 4512, 4612, and 4712 is smaller than the activation amount by the energy ray E of the first principal surfaces 4411, 4511, 4611, and 4711.

According to such a vibration element 1*a*, in the second principal surfaces 4412, 4512, 4612, and 4712, since it is suppressed that the bonding amount of the substance M varies largely from each other, even if the second principal surfaces 4412, 4512, 4612, and 4712 are unintentionally irradiated with the energy ray E, the deviation of the vibration balance of the drive vibration arms 44 to 47 over time is easily suppressed. For that reason, it is possible to obtain the vibration element 1 in which generation of the vibration leakage is suppressed.

Further, as described above, the drive vibration arms 44 and 45, 46, and 47 illustrated in FIG. 3 include the arm portions 440, 450, 460, and 470 positioned on the base portion 41 side, the weight portions 441, 451, 461, and 471 positioned closer to the tip end side than the arm portions 440, 450, 460, and 470, that is, on the side opposite to the base portion 41, and the weight films 51, 52, 53, and 54 which are examples of frequency adjustment film.

According to such drive vibration arms 44 to 47, it is possible to sufficiently increase the area of each of the first principal surfaces 4411, 4511, 4611, and 4711 provided in the weight portions 441, 451, 461, and 471 having a large width. For that reason, the area and mass of each of the weight films 51, 52, 53, and 54 can also be made sufficiently large, and it is possible to sufficiently secure adjustment efficiency, accuracy, and an adjustment width of the resonance frequency.

Further, in this embodiment, the first principal surfaces 4411, 4511, 4611, and 4711, that is, the weight films 51, 52, 53, and 54 preferably contain a metal material. That is, in this embodiment, the first principal surfaces 4411, 4511, 4611, and 4711 are preferably surfaces containing a metal material. With this configuration, in the first principal surfaces 4411, 4511, 4611, and 4711, a specific gravity of the constituent material is increased, and mass change when the first principal surfaces 4411, 4511, 4611, and 4711 are irradiated with the energy ray E can be efficiently performed. Also, the metallic material has relatively good machinability with the energy ray E. As a result, it is possible to efficiently adjust the resonance frequency of the vibration element 1*a*.

On the other hand, in this embodiment, the second principal surfaces 4412, 4512, 4612, and 4712 preferably contain an oxide material. That is, in this embodiment, the second principal surfaces 4412, 4512, 4612, and 4712 are preferably surfaces containing an oxide material. As the oxide material, the aluminum oxide, silicon oxide such as quartz crystal, titanium oxide, zirconium oxide, yttrium oxide and the like described above may be included, and one kind or two or more kinds thereof are used. By using such an oxide material, the activation amount of the second principal surfaces 4412, 4512, 4612, and 4712 by the energy ray E can be suppressed particularly small. For that reason, it is possible to further prevent the bonding amount of the substance M from largely varying from each other on the second principal surfaces 4412, 4512, 4612, and 4712.

In this embodiment, since the weight film is not provided on the lower surface of each of the weight portions 441, 451, 461, and 471, the second principal surfaces 4412, 4512, 4612, and 4712 are surfaces containing the constituent material of the vibrating body 4 such as quartz crystal.

Quartz crystal is generally a material with higher cleanliness than other materials, that is, a material with a small amount of substance M adhering from the beginning and is also a material with a high degree of uniformity of its cleanliness and small variation in cleanliness depending on the part. For that reason, for example, it is avoided that the cleanliness greatly varies for each of the drive vibration arms 44, 45, 46, and 47, and deterioration of the mass balance due to the difference in cleanliness can be avoided. Accordingly, it is possible to adjust the resonance frequency more accurately.

The expression of "an activation amount is small" means that an adhesion amount of an organic substance per unit area is univocally small in an irradiation region of the energy ray E. Accordingly, if adhesion of the organic substance occurs under a predetermined condition, it means that the adhesion amount at that time is small. The activation amount of the second principal surfaces 4412, 4512, 4612, and 4712 by the energy ray E may be smaller than the activation amount by the energy ray E of the first principal surfaces 4411, 4511, 4611, and 4711, but is preferably 95% or less of the activation amount of the first principal surfaces, more preferably 90% or less of the activation amount of the first principal surfaces.

The magnitude of the activation amount can be evaluated by a method of measuring an adhesion amount of an organic substance as follows.

First, ten vibrator elements whose surface condition region to be measured are formed to have an area of 0.2 mm×0.2 mm or more are prepared and an amount of carbon on the surface of a measurement target region before exposure to an organic substance atmosphere is measured by the X-ray photoelectron spectroscopy (XPS). Then, an average value of carbon content of 10 samples is calculated. As an XPS apparatus, for example, Quantera II manufactured by ULVAC-PHI, INC. can be used.

Next, these vibrator elements and 2 ml of grease placed in a glass laboratory dish are sealed in a glass container at atmospheric pressure and is subjected to exposure to an organic substance atmosphere at 25° C. for 168 hours. For the measurement target region of the sample after the exposure, a carbon amount on the front surface is measured by the XPS in the same manner as the measurement before the exposure, and an average value of the carbon amount of 10 samples is obtained. As grease, for example, AFE-CA grease manufactured by THK CO., LTD. can be used. A difference in the average carbon amount of the front surface before and after the exposure to this organic substance atmosphere is obtained and used as an indicator of the activation amount.

In addition, easiness of adhesion of organic substances is affected by the bonding force between atoms in the irradiation region of the energy ray E. Therefore, the expression of "the activation amount is small" means, in a second meaning, that the sample is made of a material having a relatively high bonding force between atoms in an adhered region. Specifically, since the bonding force between atoms is large in the order of covalent bond, ionic bond, metal bond, for example, in a case where the first principal surfaces 4411, 4511, 4611, and 4711 contain a metal material and the second principal surfaces 4412, 4512, 4612, and 4712 contain an oxide material, an interatomic bond between atoms of the metal material is a metal bond and an interatomic bond between atoms of the oxide material is a covalent bond and thus it can be said that the activation amount of the second principal surfaces 4412, 4512, 4612, and 4712 by the energy ray E is smaller than the activation amount by the energy ray E of the first principal surfaces 4411, 4511, 4611, and 4711.

In this case, the molecular weight or atomic weight of the material, for example, an oxide material, contained in the second principal surfaces 4412, 4512, 4612, and 4712 is preferably smaller than the atomic weight or molecular weight of the material, for example, a metal material contained in the first principal surfaces 4411, 4511, 4611, and 4711. With this configuration, the difference in activation amount becomes larger, and the effect described above becomes more remarkable.

As the metal material, for example, various metal materials described above may be included.

Furthermore, the second principal surfaces 4412, 4512, 4612, and 4712 including the material having a relatively small activation amount, for example, the oxide material or the like tend to have a smaller machining rate by the energy ray E, that is, the machining amount per unit time than the first principal surfaces 4411, 4511, 4611, and 4711 including the material having a relatively large activation amount, for example, the metal material or the like. For that reason, it can be said that the second principal surfaces 4412, 4512, 4612, 4712 are not only relatively small in the adhesion amount of the organic substances but also are hardly machined in the first place. Accordingly, such second principal surfaces 4412, 4512, 4612, and 4712 also make it possible to suppress deterioration in adjustment accuracy of the resonance frequency caused by occurrence of unintended machining and a decrease in mass.

On the other hand, as a material contained in the second principal surfaces 4412, 4512, 4612, and 4712, in addition to an oxide material, a nitride material such as silicon nitride, aluminum nitride, titanium nitride, boron nitride, a carbide material such as silicon carbide, graphite, tungsten carbide, a ferroelectric material such as barium titanate, strontium titanate, PZT, PLZT, PLLZT, various resin materials, and the like may be included, and one kind or two or more kinds of the materials can be used in combination.

The magnitude relation of the activation amount as described above may be established in at least a part of the upper surfaces of the weight portions 441, 451, 461, and 471 and the lower surfaces of the weight portions 441, 451, 461, and 471.

Specifically, in FIG. 3, the weight films 51, 52, 53, and 54 are provided on parts of the upper surfaces of the weight portions 441, 451, 461, and 471, respectively. That is, the parts of the upper surfaces of the weight portions 441, 451, 461, and 471 are the first principal surfaces 4411, 4511, 4611, and 4711, respectively.

As described above, even in a case where the magnitude relation of the activation amount is satisfied on a part of each of the upper and lower surfaces of each of the weight portions 441, 451, 461, and 471, the effect described above can be obtained.

The first principal surfaces 4411, 4511, 4611, and 4711 preferably occupy respectively 50% or more of areas of the upper surfaces of the weight portions 441, 451, 461, and 471, and more preferably occupies 70% or more.

Similarly, the second principal surfaces 4412, 4512, 4612, and 4712 preferably occupy respectively 50% or more of the areas of the lower surfaces of the weight portions 441, 451, 461, and 471, and more preferably occupies 70% or more.

Further, the vibrating body 4 according to this embodiment has a so-called double T shape. For that reason, the vibration element 1a includes a pair of drive vibration arms 44 and 46 and a pair of drive vibration arms 45 and 47 extending in the same direction from the base portion 41. Since such a vibration element 1a has high shape symmetry, it is easy to adjust the resonance frequency by the energy ray E, and as a result, the vibration element 1 with less vibration leakage can be obtained.

The recesses 511, 521, 531, and 541 may have any shape, but, in this embodiment, the shapes are set so as to have the same area in a plan view in the thickness direction of the base portion 41. That is, in this embodiment, in a plan view in the thickness direction of the base portion 41, the region where one drive vibration arm 44 is irradiated with the energy ray E, that is, the area of the recess 511 is set to be equal to the region where the other drive vibration arm 46 is irradiated with the energy ray E, that is, the area of the recess 531. Similarly, the region where one drive vibration arm 45 is irradiated with the energy ray E, that is, the area of the recess 521 is set to be equal to the region where the other drive vibration arm 47 is irradiated with the energy ray E, that is, the area of the recess 541. With this configuration, the amounts of the substances M bonded to the recesses 511, 521, 531, and 541 can be made substantially equal to each other. As a result, it is possible to prevent the vibration balance of the drive vibration arms 44 to 47 from deviating over time after forming the recesses 511, 521, 531, and 541 and adjusting the resonance frequency of the drive vibration arms 44 to 47.

The area of each of the recesses 511, 521, 531, and 541 in a plan view is not particularly limited, but it is, for example, approximately 1 $\mu m^2$ to 20000 $\mu m^2$.

A plurality of recesses may be formed in each of the drive vibration arms 44 to 47. Also, in this case, it is preferable that the sum of the areas of the recesses is set to be the same in each of the drive vibration arms 44 to 47.

Also, in this specification, the terms of "same" and "equal" indicate substantially the same or equal and are meant to include errors in mechanical design, installation, or the like. Accordingly, the terms of "same" and "equal" mean that the difference between targeted objects is within ±5%.

The areas of the recesses 511, 521, 531, and 541 in a plan view are not necessarily the same as each other, and may be different from each other.

The recess 511 and the recess 531 may be formed at any position of the weight film 51 and the weight film 53, respectively, but in this embodiment, with respect to the position in the X-axis direction, the recess 511 and the recess 531 are provided at positions that are line-symmetrical with respect to each other when a line segment A passing through the center of the base portion 41 and parallel to the Y-axis is taken as the axis of symmetry. Similarly, the recess 521 and the recess 541 are provided at positions that are line-symmetrical with respect to each other when the line segment A is taken as the axis of symmetry. In this embodiment, with respect to the position in the Y-axis direction, the recesses 511, 521, 531, and 541 are positioned on the tip end sides of the weight portions 441, 451, 461, and 471, respectively. With this configuration, it is possible to efficiently and accurately adjust the resonance frequencies of the drive vibration arms 44 to 47 requiring minute adjustments.

In this embodiment, in the depths of the recesses 511, 521, 531, and 541, at least one depth of the recesses 511, 521, 531, and 541 is different from the depths of the other recesses. With this configuration, volumes of the recesses 511, 521, 531, and 541 can be made different from each other without substantially changing the areas of the recesses 511, 521, 531, and 541 in a plan view in the thickness direction of the base portion 41. That is, the masses of the weight films 51, 52, 53, and 54 can be made different from each other with little change in the amount of the substance M bonded to the recesses 511, 521, 531, and 541, and the resonance frequency of the drive vibration arms 44 to 47 can be adjusted. For that reason, even if the substance M is bonded to the recesses 511, 521, 531, and 541 after forming the recesses 511, 521, 531, and 541 and adjusting the resonance frequencies of the drive vibration arms 44 to 47, since unbalance in the bonding amount is unlikely to occur, it is possible to prevent the vibration balance of the drive vibration arms 44 to 47 from being deviated over time.

The depths d1 to d4 of the recesses 511, 521, 531 and 541 are each, for example, approximately 1 nm to 2000 nm.

Further, by changing the depth without changing the areas of the recesses 511, 521, 531, and 541 in a plan view, it is possible to suppress an amount of movement for scanning with the energy ray E, that is, a scanning amount to be small. With this configuration, it is possible to easily and efficiently adjust the frequency.

The depths of the recesses 511, 521, 531, and 541 may be equal to each other as a result of adjustment of the resonance frequency.

As described above, it is preferable that the pair of drive vibration arms 44 and 46 are parallel to each other in a plan view. Similarly, it is preferable that the pair of drive vibration arms 45 and 47 are parallel to each other in a plan view. With this configuration, it is possible to efficiently and accurately adjust the resonance frequencies of the drive vibration arms 44 to 47 requiring minute adjustment.

As described above, the pair of drive vibration arms 44, 46 are parallel to each other and extend to the same side with respect to the base portion 41, in a plan view. Similarly, the pair of drive vibration arms 45 and 47 are parallel to each other and extend to the same side with respect to the base portion 41, in a plan view.

According to such a vibration element 1 or vibration element 1a, it is possible to suppress deformation of the base portion 41 due to flexural vibration in which the pair of drive vibration arms 44 and 46 alternately repeats approaching and separating from each other and the flexural vibration in which the pair of drive vibration arms 45 and 47 alternately repeats approaching and separating from each other in the X-Y plane, and to further suppress vibration leakage from the base portion 41 to the outside. In addition, by using the adjustment method in this embodiment for such a vibration element 1 or vibration element 1a, the vibration leakage due to deviation of the vibration balance of the drive vibration arms 44 to 47 over time can be reduced and therefore, the vibration element 1 with high accuracy and high stability can be realized.

In the present specification, the term of "parallel" means to allow an error in manufacturing.

As described above, the manufacturing method of the vibration element 1 includes a frequency adjustment method of the vibration element 1a. With this configuration, it is possible to obtain the vibration element 1 with reduced vibration leakage due to deviation of the vibration balance of the drive vibration arms 44 to 47 over time.

In addition, the physical quantity sensor 10 includes such a vibration element 1 and a package 11 that accommodates the vibration element 1. With this configuration, it is possible to realize the physical quantity sensor 10 with high accuracy and high stability.

4. Inertial Measurement Device

Figure 10:
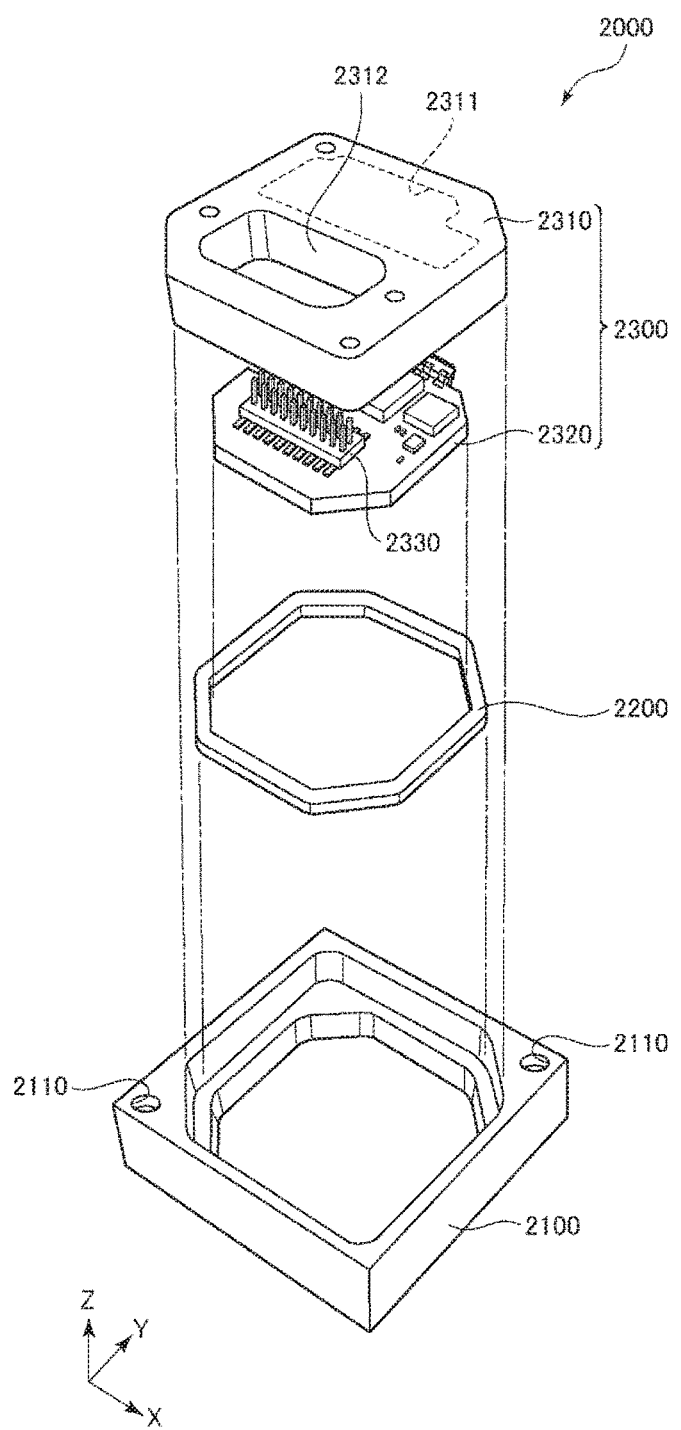
FIG. 10 is an exploded perspective view illustrating an embodiment of an inertial measurement device according to the invention.
Figure 11:
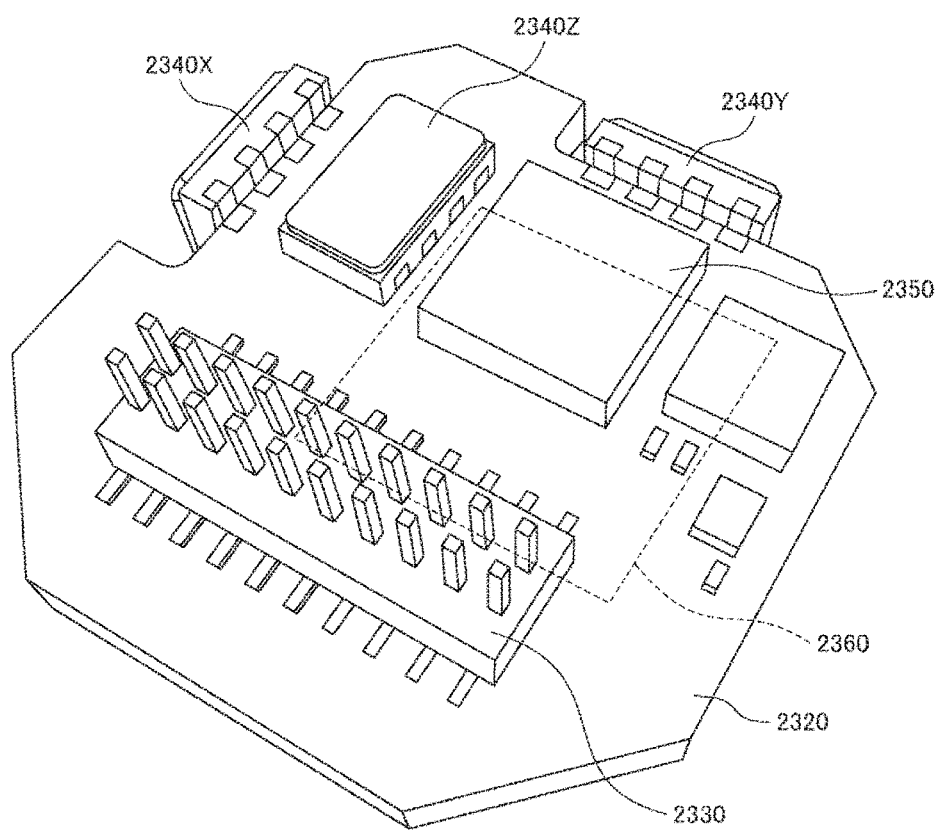
FIG. 11 is a perspective view of a substrate provided in the inertial measurement device illustrated in FIG. 10.

FIG. 10 is an exploded perspective view illustrating an embodiment of the inertial measurement device according to the invention. FIG. 11 is a perspective view of a substrate included in the inertial measurement device illustrated in FIG. 10.

An inertial measurement device (which corresponds to inertial measurement unit (IMU)) 2000 illustrated in FIG. 10 is a so-called six-axis motion sensor, is used by being attached to a vehicle such as an automobile, a robot, that is, a measurement target, and detects an attitude and behavior, that is, inertial momentum of the vehicle.

The inertial measurement device 2000 includes an outer case 2100, a joining member 2200, and a sensor module 2300. The sensor module 2300 is engaged in the outer case 2100 in a state where the joining member 2200 is interposed.

The outer case 2100 has a box-like shape, and two corner portions at diagonal corners of the outer case 2100 are provided with screw holes 2110 for screwing the measurement target.

The sensor module 2300 includes an inner case 2310 and a substrate 2320. The sensor module 2300 is accommodated inside the outer case 2100 in a state where the inner case 2310 supports the substrate 2320. Here, the inner case 2310 is joined to the outer case 2100 with an adhesive or the like via the joining member 2200 such as a rubber packing. The inner case 2310 has a recess 2311 functioning as a storage space for components to be mounted on the substrate 2320 and an opening 2312 for exposing the connector 2330 provided on the substrate 2320 to the outside. The substrate 2320 is, for example, a multilayer wiring board, and is joined to the inner case 2310 with an adhesive or the like.

As illustrated in FIG. 11, the connector 2330, angular velocity sensors 2340X, 2340Y, and 2340Z, an acceleration sensor 2350, and a control IC 2360 are mounted on the substrate 2320.

The connector 2330 is electrically connected to an external device (not illustrated), and is used to transmit and receive electric signals such as electric power and measurement data between the external device and the inertial measurement device 2000.

The angular velocity sensor 2340X detects the angular velocity around the X-axis, the angular velocity sensor 2340Y detects the angular velocity around the Y-axis, and the angular velocity sensor 2340Z detects the angular velocity around the Z-axis. Here, each of the angular velocity sensors 2340X, 2340Y, and 2340Z is the physical quantity sensor 10 described above. Further, the acceleration sensor 2350 is, for example, an acceleration sensor formed by using the MEMS technology and detects acceleration in each of the X-axis, Y-axis, and Z-axis directions.

The control IC 2360 is a micro controller unit (MCU), incorporates a storage unit including a nonvolatile memory, an A/D converter, and the like, and controls each portion of the inertial measurement device 2000. Here, the storage unit stores a program that defines the order and contents for detecting acceleration and angular velocity, a program that digitizes detection data to be incorporated into packet data, accompanying data, and the like.

As described above, the inertial measurement device 2000 includes the physical quantity sensor 10, such as the angular velocity sensors 2340X, 2340Y, and 2340Z, that includes vibration element 1 and the control IC 2360 which is a circuit electrically connected to the physical quantity sensor 10. According to such an inertial measurement device 2000, it is possible to improve characteristics, for example, measurement accuracy, of the inertial measurement device 2000 by using excellent sensor characteristics of the physical quantity sensor 10.

5. Electronic Apparatus

Figure 12:
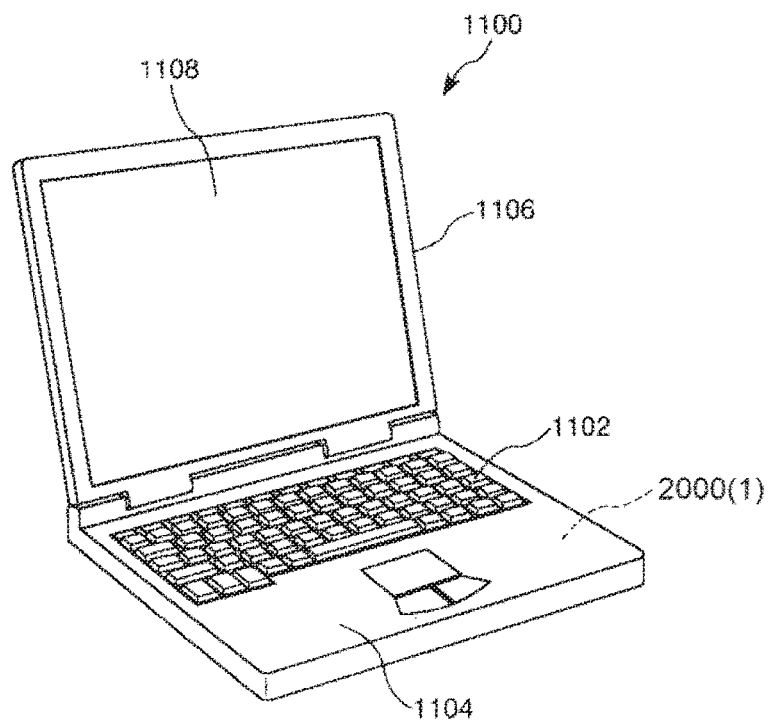
FIG. 12 a perspective view illustrating an embodiment (mobile type personal computer) of an electronic apparatus according to the invention.

FIG. 12 is a perspective view illustrating a mobile type personal computer which is an embodiment of the electronic apparatus according to the invention.

In FIG. 12, a personal computer 1100 is constituted by a main body 1104 provided with a keyboard 1102 and a display unit 1106 provided with a display part 1108, and the display unit 1106 is rotatably supported to the main body 1104 via a hinge structure. In such a personal computer 1100, an inertial measurement device 2000 including the vibration element 1 described above is incorporated.

Figure 13:
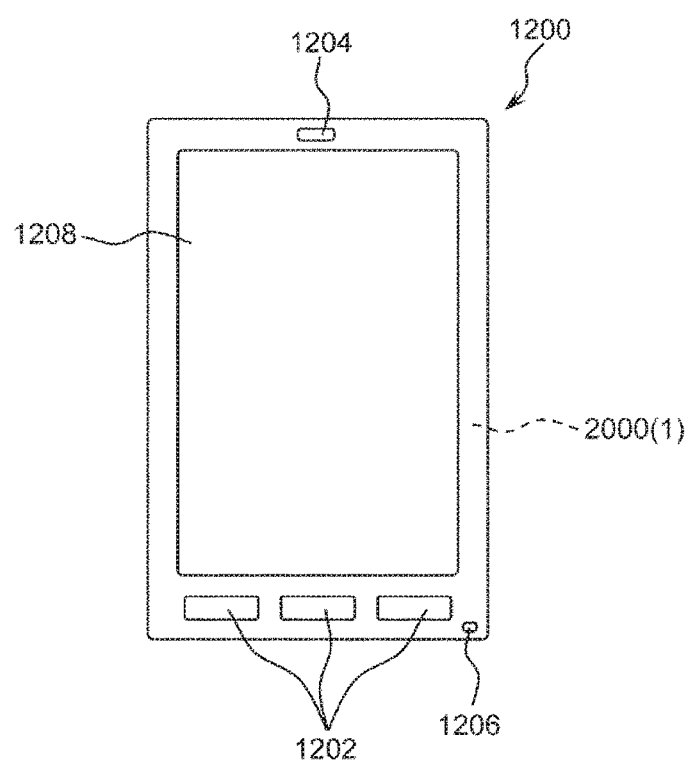
FIG. 13 is a plan view illustrating another embodiment (mobile telephone) of the electronic apparatus according to the invention.

FIG. 13 is a plan view illustrating a mobile phone which is an embodiment of the electronic apparatus according to the invention.

In FIG. 13, a mobile phone 1200 includes an antenna (not illustrated), a plurality of operation buttons 1202, an earpiece 1204, and a mouthpiece 1206, and a display unit 1208 is disposed between the operation button 1202 and the earpiece 1204. In such a mobile phone 1200, the inertial measurement device 2000 including the vibration element 1 described above is incorporated.

Figure 14:
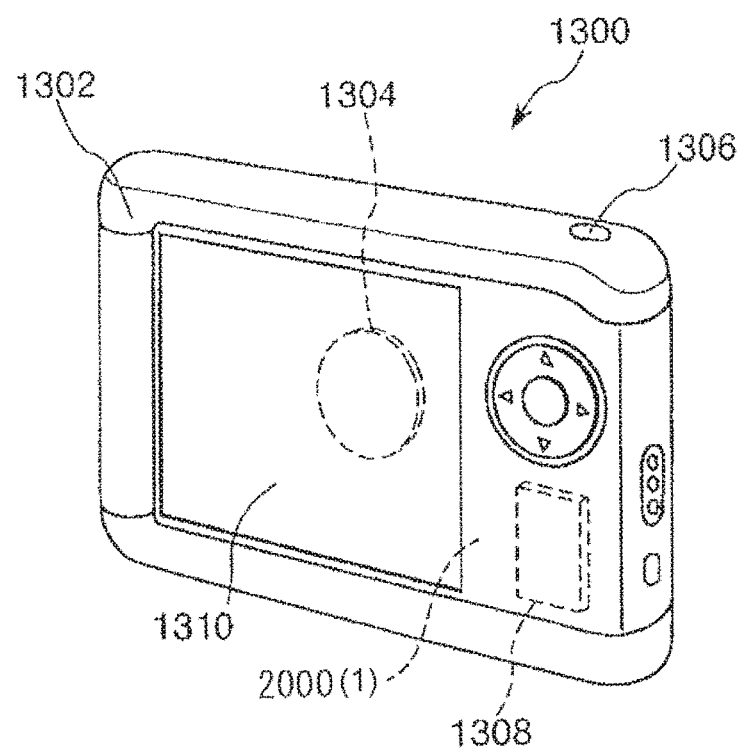
FIG. 14 is a perspective view illustrating another embodiment of the electronic apparatus (digital still camera) according to the invention.

FIG. 14 is a perspective view illustrating a digital still camera which is an embodiment of the electronic apparatus according to the invention.

In FIG. 14, a display portion 1310 is provided on the rear surface of a case 1302 in a digital still camera 1300 and is configured to perform display based on an image-capturing signal of a CCD, and the display portion 1310 functions as a viewfinder for displaying a subject as an electronic image. A light receiving unit 1304 including an image-capturing optical system such as an optical lens, a CCD or the like is provided on a front side, that is, the back side in the figure of the case 1302. When a photographer confirms a subject image displayed on the display portion 1310 and presses a shutter button 1306, an image-capturing signal of the CCD at that time is transferred to be stored in the memory 1308. In such a digital still camera 1300, the inertial measurement device 2000 including the vibration element 1 described above is accommodated, and the measurement result of the inertial measurement device 2000 is used, for example, for camera shake correction.

The electronic apparatus as described above includes the vibration element 1. According to such an electronic apparatus, it is possible to improve the characteristics, for example, reliability, of the electronic apparatus by utilizing the excellent characteristics of the vibration element 1.

In addition to the personal computer of FIG. 12, the mobile phone of FIG. 13, and the digital still camera of FIG. 14, the electronic apparatus according to the invention may be applied to, for example, a smartphone, a tablet terminal, a clock including a smart watch, an ink jet type ejecting device, for example, an ink jet printer, a wearable terminal such as a head mounted display (HMD) a laptop type personal computer, a television, a video camera, a video tape recorder, a car navigation device, a pager, an electronic notebook including electronic notebook with a communication function, an electronic dictionary, a calculator, an electronic game device, a word processor, a workstation, a video phone, a TV monitor for crime prevention, an electronic binocular, a POS terminal, a medical device (for example, an electronic thermometer, a blood pressure monitor, a blood glucose meter, an electrocardiogram measuring device, an ultrasonic diagnostic device, an electronic endoscope), a fish finder, various measuring instruments, instruments (for example, instruments of an automobile, aircraft, rocket, and a ship), a base station for a portable terminal, a flight simulator, and the like.

6. Vehicle

FIG. 15 is a perspective view illustrating an automobile which is an embodiment of the invention.

In an automobile 1500 illustrated in FIG. 15, the inertial measurement device 2000 including the vibration element 1 described above is incorporated, and an attitude of a vehicle body 1501 can be detected by, for example, the inertial measurement device 2000. The detection signal of the inertial measurement device 2000 is supplied to a vehicle body attitude control device 1502. The vehicle body attitude control device 1502 can detect the attitude of the vehicle body 1501 based on the detection signal and control hardness and softness of a suspension according to the detection result or control brakes of individual wheels 1503.

In addition, such attitude control can be utilized for a two-leg walking robot and a radio control helicopter such as a drone. As described above, in order to realize attitude control of the vehicles, the inertial measurement device 2000 is incorporated.

As described above, the automobile 1500 which is a vehicle includes the vibration element 1. According to such an automobile 1500, it is possible to improve characteristics, for example, reliability of the automobile 1500 by utilizing excellent characteristics of the vibration element 1.

Although the frequency adjustment method of the vibration element, the manufacturing method of the vibration element, the vibration element, the physical quantity sensor, the inertial measurement device, the electronic apparatus, and the vehicle according to the invention have been described based on the illustrated embodiments, the invention is not limited thereto, and the configuration of each unit can be replaced with any configuration having the same function. Further, any other constituent elements may be added to the invention.

In the embodiments described above, the vibration element includes the weight portion, but the vibration element may not include the weight portion. That is, the width of the region on the tip end side of the drive vibration arm may be the same width as the region on the base end side, that is, the same as the arm portion. In this case, it is assumed that a range of 30% from the tip end of the drive vibration arm, that is, a range of 30% of the total length of the drive vibration arm is regarded as a weight portion, and it suffices as long as the magnitude relation of the activation amount as described above is established between the first principal surface and the second principal surface.

In addition, although the vibration element has two sets each of which is the pair of drive vibration arms that are parallel to each other and extend to the same side with respect to the base portion in a plan view, the pair of drive vibration arms may be one set.

In the embodiments described above, the vibration element has a so-called double T shape, but the vibration element is not limited thereto, and various forms, for example, an H-type vibration element, a two-legged tuning fork, a three-legged tuning fork, an orthogonal type vibration element, a prismatic type vibration element, and the like may be adopted.

Further, as the constituent material of the vibrating body described above, for example, piezoelectric single quartz crystals such as lithium tantalate and lithium niobate other than quartz crystal, and piezoelectric materials such as piezoelectric ceramics may be used.

What is claimed is:

1. A frequency adjustment method comprising:
preparing a substrate of quartz crystal;
etching the substrate to form a vibration element, the vibration element having a first principal surface and a second principal surface outwardly opposite to each other, the vibration element being configured with:
a base;
an arm continuously extending from the base; and
a weight continuously extending from the arm;
forming a metal layer on the first principal surface of the weight; and
adjusting a resonance frequency of the vibration element by irradiating the vibration element with an energy ray, to remove a part of the metal layer on the first principal surface of the weight,
wherein an entirety of the second principal surface of the weight exposes the quartz crystal, and
an activation amount by the energy ray on the second principal surface of the vibration element is smaller than an activation amount by the energy ray on the first principal surface of the vibration element.

2. The frequency adjustment method according to claim 1, wherein at least a part of the metal layer on the first principal surface is irradiated with the energy ray.

3. The frequency adjustment method according to claim 2, wherein the second principal surface of the weight contains an oxide material.

4. A manufacturing method of a vibration element comprising: the frequency adjustment method according to claim 3.

5. A manufacturing method of a vibration element comprising: the frequency adjustment method according to claim 2.

6. The frequency adjustment method according to claim 1, wherein the vibration element includes a pair of the arms extending in a same direction from the base, and
a pair of the weights extend from the pair of the arms.

7. The frequency adjustment method according to claim 6, wherein an area of a region irradiated with the energy ray for one of the pair of the weights is the same as an area of a region irradiated with the energy ray for the other of the pair of the weight in a plan view.

8. A manufacturing method of a vibration element comprising: the frequency adjustment method according to claim 7.

9. A manufacturing method of a vibration element comprising: the frequency adjustment method according to claim 1.

10. A manufacturing method of a vibration element comprising: the frequency adjustment method according to claim 6.

11. A vibration element comprising:
a substrate of quartz crystal, the substrate being configured with:
a base;
an arm continuously extending from the base; and
a weight continuously extending from the arm, the weight having a first principal surface and a second principal surface outwardly opposite to each other, a metal layer being formed on the first principal surface of the weight,
wherein an entirety of the second principal surface of the weight exposes the quartz crystal, and
an activation amount of the second principal surface of the weight when an energy ray is radiated is smaller than an activation amount of the first principal surface of the weight when the energy ray is radiated.

12. The vibration element according to claim 11, wherein at least a part of the metal layer on the first principal surface is irradiated with the energy ray.

13. The vibration element according to claim 12, wherein the second principal surface of the weight portion contains an oxide material.

14. The vibration element according to claim 11, wherein the vibration element includes a pair of the arms extending in a same direction from the base, and
a pair of the weights extend from the pair of the arms.

15. The vibration element according to claim 14, wherein an area of a region irradiated with the energy ray for one of the pair of the weights is the same as an area of a region irradiated with the energy ray for the other of the pair of the weights in a plan view.

16. A physical quantity sensor, comprising:
the vibration element according to claim 11; and
a package accommodating the vibration element.

17. An inertial measurement device, comprising:
the physical quantity sensor according to claim 16; and
a circuit electrically connected to the physical quantity sensor.

18. An electronic apparatus, comprising:
the vibration element according to claim 11; and
a circuit for outputting a drive signal to the vibration element.

19. A vehicle, comprising:
the vibration element according to claim 11; and
a body on which a physical quantity sensor including the vibration element is mounted.

* * * * *